United States Patent
Lokanath et al.

(10) Patent No.: US 12,531,060 B2
(45) Date of Patent: Jan. 20, 2026

(54) METHODS AND ELECTRONIC DEVICE FOR PROVIDING INTERACTION WITH VIRTUAL ASSISTANT

(71) Applicant: SAMSUNG ELECTRONICS CO., LTD., Suwon-si (KR)

(72) Inventors: Manjunath Belgod Lokanath, Bengaluru (IN); Sourabh Tiwari, Bengaluru (IN); Vinay Vasanth Patage, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 407 days.

(21) Appl. No.: 18/101,280

(22) Filed: Jan. 25, 2023

(65) Prior Publication Data
US 2023/0282211 A1 Sep. 7, 2023

Related U.S. Application Data

(63) Continuation of application No. PCT/KR2022/016184, filed on Oct. 21, 2022.

(30) Foreign Application Priority Data

Feb. 18, 2022 (IN) .............................. 202241008552

(51) Int. Cl.
  *G10L 15/22* (2006.01)
  *G10L 15/04* (2013.01)
  (Continued)

(52) U.S. Cl.
  CPC .............. *G10L 15/22* (2013.01); *G10L 15/04* (2013.01); *G10L 15/05* (2013.01);
  (Continued)

(58) Field of Classification Search
  None
  See application file for complete search history.

(56) References Cited

U.S. PATENT DOCUMENTS 9,799,328 B2 * 10/2017 Aravamudan ...... G10L 15/1822
10,140,975 B2 * 11/2018 Buchanan ............. G06F 40/284
(Continued)

FOREIGN PATENT DOCUMENTS

CN   111105782 A   5/2020
CN   113228167 A   8/2021
(Continued)

OTHER PUBLICATIONS

Communication issued on Aug. 16, 2024 by the Intellectual Property India for Indian Patent Application No. 202241008552.
(Continued)

*Primary Examiner* — Richard Z Zhu
(74) *Attorney, Agent, or Firm* — Sughrue Mion, PLLC

(57) ABSTRACT

A method for providing an interaction with a virtual assistant, includes identifying, by an electronic device, at least one of a duration of a silence between a first portion of an utterance received from a user and a second portion of the utterance, and a position of the silence in the utterance; determining, by the electronic device, a contextual relationship between the first portion of the utterance and the second portion of the utterance based on the at least one of the duration of the silence and the position of the silence; determining, by the electronic device, at least one execution criteria corresponding to the first portion of the utterance and the second portion of the utterance based on the determined contextual relationship; and generating, by the electronic device, a response corresponding to the utterance by execut-
(Continued)

ing the first portion of the received utterance and the second portion of the received utterance using the at least one execution criteria.

13 Claims, 44 Drawing Sheets

(51) Int. Cl.
   *G10L 15/05*    (2013.01)
   *G10L 15/18*    (2013.01)
   *G10L 25/87*    (2013.01)
   *G10L 15/20*    (2006.01)
   *G10L 25/78*    (2013.01)
   *G10L 25/84*    (2013.01)

(52) U.S. Cl.
   CPC .......... *G10L 15/1815* (2013.01); *G10L 25/87* (2013.01); *G10L 15/1822* (2013.01); *G10L 15/20* (2013.01); *G10L 2015/223* (2013.01); *G10L 25/78* (2013.01); *G10L 25/84* (2013.01)

(56) References Cited

U.S. PATENT DOCUMENTS

| | | | | |
|---|---|---|---|---|
| 10,614,799 | B2* | 4/2020 | Kennewick, Jr | G10L 15/18 |
| 10,943,606 | B2* | 3/2021 | Doshi | G10L 15/19 |
| 11,145,302 | B2* | 10/2021 | Byun | G10L 15/26 |
| 11,238,850 | B2* | 2/2022 | Mukherjee | G10L 15/063 |
| 11,289,085 | B2* | 3/2022 | Wooters | G10L 15/1815 |
| 11,335,334 | B2* | 5/2022 | Iwase | G10L 15/02 |
| 11,710,477 | B2* | 7/2023 | Tadpatrikar | G10L 15/065 |
| | | | | 704/235 |
| 11,715,469 | B2* | 8/2023 | Sharma | G10L 15/16 |
| | | | | 704/235 |
| 12,243,517 | B1* | 3/2025 | Mehrabani | G10L 15/063 |
| 2012/0221336 | A1 | 8/2012 | Degani et al. | |
| 2016/0358598 | A1* | 12/2016 | Williams | G10L 17/02 |
| 2018/0089167 | A1* | 3/2018 | Robichaud | G06F 16/3325 |
| 2019/0318759 | A1 | 10/2019 | Doshi et al. | |
| 2020/0219487 | A1* | 7/2020 | Shibuya | G10L 15/30 |
| 2021/0158812 | A1 | 5/2021 | Wooters et al. | |
| 2021/0256965 | A1 | 8/2021 | Kim et al. | |
| 2021/0280180 | A1 | 9/2021 | Skobeltsyn et al. | |
| 2023/0043430 | A1* | 2/2023 | Ben David | G06F 9/44 |
| 2023/0368781 | A1* | 11/2023 | Choi | G10L 25/78 |

FOREIGN PATENT DOCUMENTS

KR   10-2019-0127202 A   11/2019
KR   10-2020-0025226 A   3/2020

OTHER PUBLICATIONS

M. Igras-Cybulska et al., "Structure of pauses in speech in the context of speaker verification and classification of speech type", EURASIP Journal on Audio, Speech, and Music Processing, DOI 10.1186/s13636-016-0096-7, 2016 (19 total pages).

International Search Report (PCT/ISA/210) issued by the International Searching Authority on Jan. 30, 2023 for International Patent Application No. PCT/KR2022/016184.

Written Opinion (PCT/ISA/237) issued by the International Searching Authority on Jan. 30, 2023 for International Patent Application No. PCT/KR2022/016184.

* cited by examiner

1700a

What was today's IPL result? <silence> Man of the match

ASR final hypothesis:

"What was today's IPL result {silence} Man of the match"

NLU Slot Identification & Intent Resolution:

Intent : News
Criteria {search} : IPL result - Man of the Match
Criteria {time} : today

100

ABC team won today,
and "Player A" was awarded man of the match.

METHODS AND ELECTRONIC DEVICE FOR PROVIDING INTERACTION WITH VIRTUAL ASSISTANT

CROSS-REFERENCE TO RELATED APPLICATIONS

This application is a continuation application, claiming priority under § 365(c), of International application No. PCT/KR2022/016184, filed on Oct. 21, 2022, which is based on and claims the benefit of the Indian patent application number IN202241008552, filed on Feb. 18, 2022, in the Intellectual Property Office of India, the disclosures of which are incorporated by reference herein in their entireties.

BACKGROUND

1. Field

The disclosure relates to the field of voice assistant methods, and more particularly to methods and an electronic device for providing an interaction with a voice assistant.

1. Description of Related Art

Currently, in order to interact with voice assistants, a user provides a voice command or utterance, and the voice assistant completes execution of the voice command or utterance and provides back results corresponding to the voice command or utterance. Many times, while giving the voice command, the user of the electronic device realizes issues in the voice command, such as the results will be too many, missing important values, corrections etc. In these cases, even when the user is aware of the issue, it is not possible to update the voice commands on the fly to correct the user's mistakes or enhance the results. In other words, the virtual assistant does not provide a command update mechanism on the fly, and the user of the electronic device must provide one or more follow-up commands to finish the desired task.

FIG. 1 and FIG. 2 include example illustrations (10) and (20) in which an electronic device provides interaction with the virtual assistant, according to related art.

As shown in FIG. 1, one of the ways to overcome the problem described above is by providing a follow-up command. Even though contextual follow-ups are known, it still poses the question of using two separate commands to achieve desired outcome. In related art systems or methods, the user has no way of modifying the current voice command, and must either cancel or give a follow-up command to obtain desired results.

In an example, the virtual assistant receives the query as "search notes called shopping . . . ", while giving the command, and the user realizes that the search results will be too many, and now wants to see only the recent ones, and so provides an additional command " . . . recent first <EPD>" wherein <EPD> refers to end point detection. But, in the related art method or system, based on the updated command, the virtual assistant provides the response as "Sorry, I did not find any notes by name shopping recent first". This results in reducing the user experience.

As shown in FIG. 2, multi-intent also provides one of the ways to handle complex user commands, where multiple portions of a complex commands are correlated using connecting words. In an example, user can use words like "and", "or", "however" etc. to provide a complex command for multi intent classification by a natural language processing (NLP). The multi-intent solutions fails in scenarios of negation where a portion of complex command is cancelling out the intent prescribed in the complex command (e.g. "Call Naveen <silence> Cancel"). In an example, the virtual assistant receives the query as "Call Naveen . . . ", while giving the command, the user has changed his mind and wishes to cancel it and updated the command as " . . . cancel <EPD>". But, in the current method or system, based on the updated command, the virtual assistant provides the response as "Calling Naveen" and does not cancel the call. This results in reducing the user experience.

The terms "voice assistant" and "virtual assistance" may be used interchangeably in the disclosure.

FIG. 3 depicts an NLP pipeline (30), according to related art. In voice assistants/virtual assistants, an internal implementation for handling different commands is different. When the voice command inputted to a NLP unit, first a domain classifier identifies a capsule, and then from that the capsule, most suitable intent is selected, then slots are determined accordingly, so when the user want to update the execution criteria on the go, the selection of execution criteria becomes very important for accurate execution of the command. But, this is not possible in the current NLP pipeline.

As shown in FIG. 3, the domain classifier identifies the capsule as "Alarm", Intent and slot detection identifies the intent as "Alarm creation", and the slot as "5 PM". The NLP execution block executed the command by deep link uniform resource indicator (URI), and based on the success or failure case, the natural language generation (NLG) text is generated.

There is a need to address the above mentioned disadvantages or other short comings or at least provide a useful alternative.

SUMMARY

Provided are methods and an electronic device for providing an interaction with a virtual assistant.

Also provided is a method for contextual analysis and intent/criteria correction dynamically in a complex voice command.

Also provided is a method of identifying a silence duration between a first portion and a second portion of an utterance received from a user and determine a contextual relationship between the first portion and the second portion of the utterance in reference to the identified silence.

Also provided is a method of determining execution criteria such as filtering, augmentation, negation and extension, for the received utterance in relation to determined contextual relationship and generate a response by executing the first portion and the second portion of the received utterance in relation to the determined execution criteria.

Also provided is a method of determining contextual relationship between parts of user's voice command, based on the intermediate silence detection, to enhance responses of virtual assistant, by determining suitable execution criteria such as filtering, augmentation, negation and extension.

Also provided is a method of finding contextual correlation between sub-parts of the user command and determine execution criteria and enhance the user experience in interaction with voice assistant by identifying relationship between portions of received voice command separated by a silence & thereby eliminates the need for always providing well structured voice commands in order to obtain required response from the assistant.

Also provided is a method of generating the execution criteria by contextual correlation of sub-parts and executing the first portion and the second portion of the received utterance based on execution criteria such as filtering, augmentation, negation and extension, and thus enhances the NLP execution as per user's desire. The method can be used to provide better responses to the user. The user will have a way to update the voice commands on the fly, in a single command. The user of the electronic device does not need to give follow up command to get desired results.

In accordance with an aspect of the disclosure, a method for providing an interaction with a virtual assistant includes identifying, by an electronic device, at least one of a duration of a silence between a first portion of an utterance received from a user and a second portion of the utterance, and a position of the silence in the utterance; determining, by the electronic device, a contextual relationship between the first portion of the utterance and the second portion of the utterance based on the at least one of the duration of the silence and the position of the silence; determining, by the electronic device, at least one execution criteria corresponding to the first portion of the utterance and the second portion of the utterance based on the determined contextual relationship; and generating, by the electronic device, a response corresponding to the utterance by executing the first portion of the received utterance and the second portion of the received utterance using the at least one execution criteria.

The at least one execution criteria may include at least one of a filtering criteria, an augmentation criteria, a negation criteria and an extension criteria.

The at least one execution criteria may be determined based on at least one of the duration of the silence and the position of the silence.

The at least one execution criteria may be determined using a reinforcement learning model which learns a pattern corresponding to the user, and the user of the electronic device may select preferred execution criteria based on multiple execution criteria being determined based on the pattern corresponding to the user.

The at least one execution criteria may be determined based on a correlation such that the second portion of the utterance is at least one of a filter to the first portion, an augmentation to a criterion of the first portion, a negation of intent to the first portion, and an extension of the criterion of the first portion.

The determining of the contextual relationship may include: segregating at least one part of the utterance based on the at least one of the duration of the silence and the position of the silence; generating multiple parallel instances of contextual analysis blocks to understand a relationship between the at least one part of the utterance; transforming multiple sub-part based utterances into a single executable sentence for natural language processing (NLP), wherein each of the transformed multiple sub-part based utterances are marked with a corresponding confidence score; and determining the contextual relationship based on the generated multiple parallel instances of the contextual analysis blocks.

The contextual analysis blocks may be executed in parallel for each combination of sub-parts generated by a command sieve module, and each of the contextual analysis blocks may be implemented using a data driven model having learned weights of contextual correlation between the sub-parts.

The determining of the contextual relationship may include: identifying a relationship in the first portion of the utterance based on a context of the second portion of the utterance; and determining the contextual relationship between the first portion of the utterance and the second portion of the utterance by using at least one of an intent, a slot update, a negation and an enhancement between the identified relationship, wherein the contextual relationship of sub-parts in the utterance is used to update the intent to optimize a natural language processing (NLP) response based on the duration of the silence and the position of the silence.

The position of the silence may correspond to a time period of silence within an utterance time frame.

In accordance with an aspect of the disclosure, an electronic device for providing an interaction with a virtual assistant includes a memory, a processor, and a silence based virtual assistant controller, coupled with the memory and the processor, configured to: identify at least one of a duration of a silence between a first portion of an utterance received from a user and a second portion of the utterance, and a position of the silence in the utterance; determine a contextual relationship between the first portion of the utterance and the second portion of the utterance according to the at least one of the duration of the silence and the position of the silence; determine at least one execution criteria corresponding to the first portion of the utterance and the second portion of the utterance based on the determined contextual relationship; and generate a response corresponding to the utterance by executing the first portion of the received utterance and the second portion of the received utterance using the at least one execution criteria.

The at least one execution criteria may include at least one of a filtering criteria, an augmentation criteria, a negation criteria and an extension criteria.

The at least one execution criteria may be determined based on at least one of the duration of the silence and the position of the silence.

The at least one execution criteria may be determined using a reinforcement learning model which learns a pattern corresponding to the user, and the user of the electronic device may select preferred execution criteria based on multiple execution criteria being determined based on the pattern corresponding to the user.

The at least one execution criteria may be determined based on a correlation such that the second portion of the utterance is at least one of a filter to the first portion, an augmentation to a criteria of the first portion, a negation of intent to the first portion, and tan extension of criteria.

The contextual relationship may be determined by: segregating at least one part of the utterance based on the at least one of the duration of the silence and the position of the silence; generating multiple parallel instances of contextual analysis blocks to understand a relationship between the at least one part of the utterance; transforming multiple sub-part based utterance into a single executable sentence for natural language processing (NLP), wherein each of the transformed multiple sub-part based utterances are marked with a corresponding confidence score; and determining the contextual relationship based on the generated multiple parallel instances of the contextual analysis blocks.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the scope thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
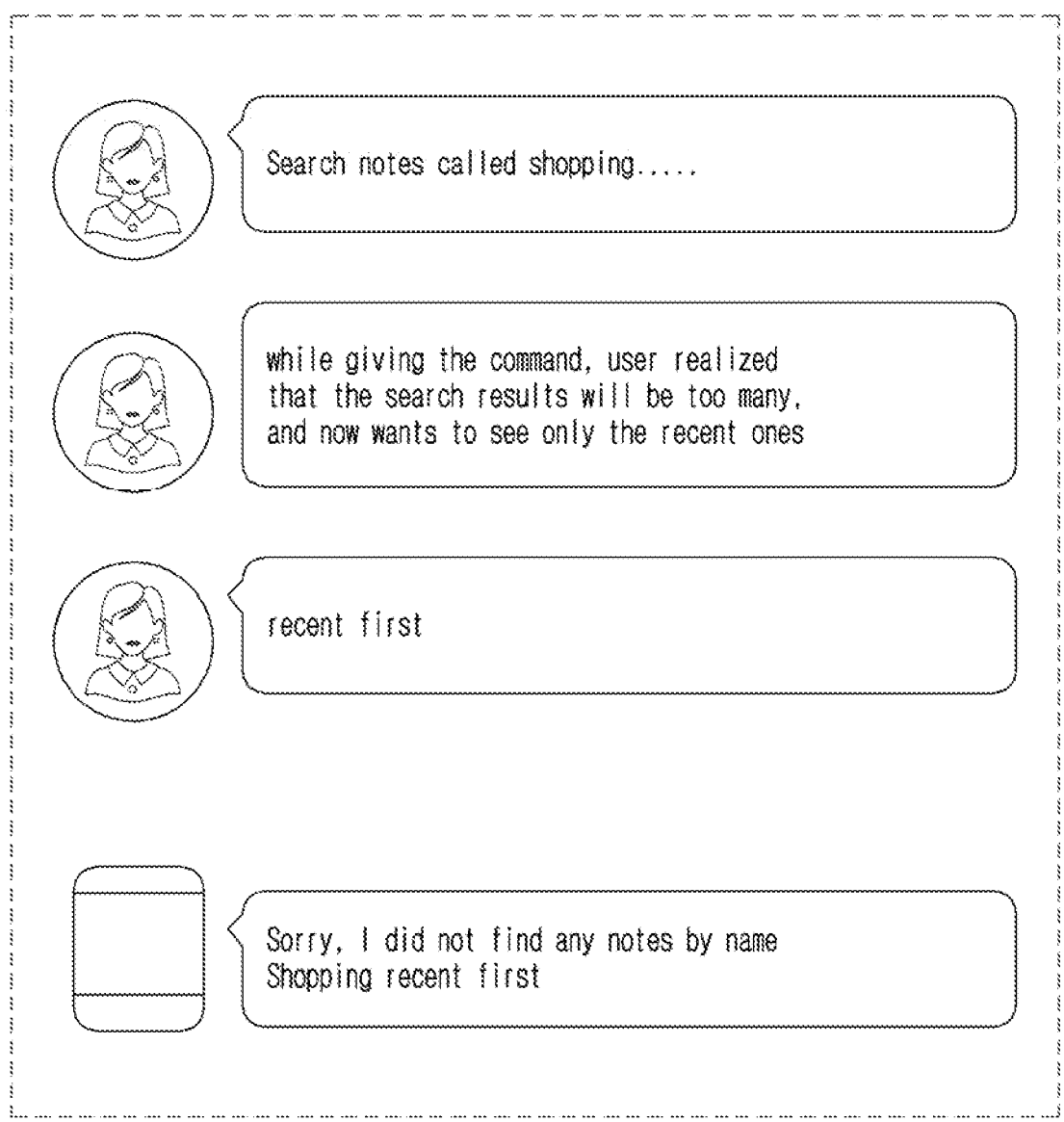
FIG. 1 and FIG. 2 are example illustrations in which an electronic device provides interaction with a virtual assistant, according to related art.
Figure 2:
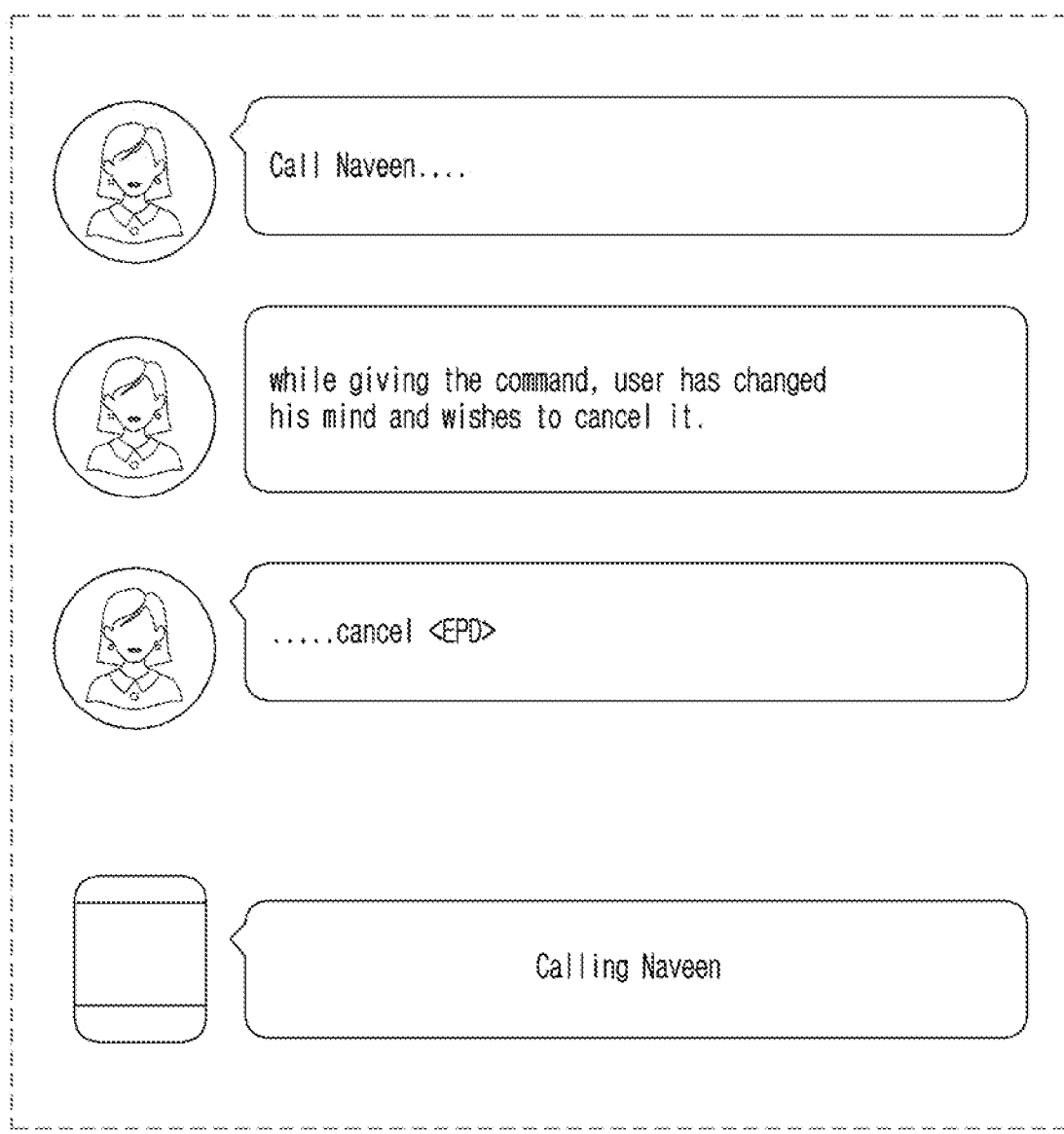
Figure 3:
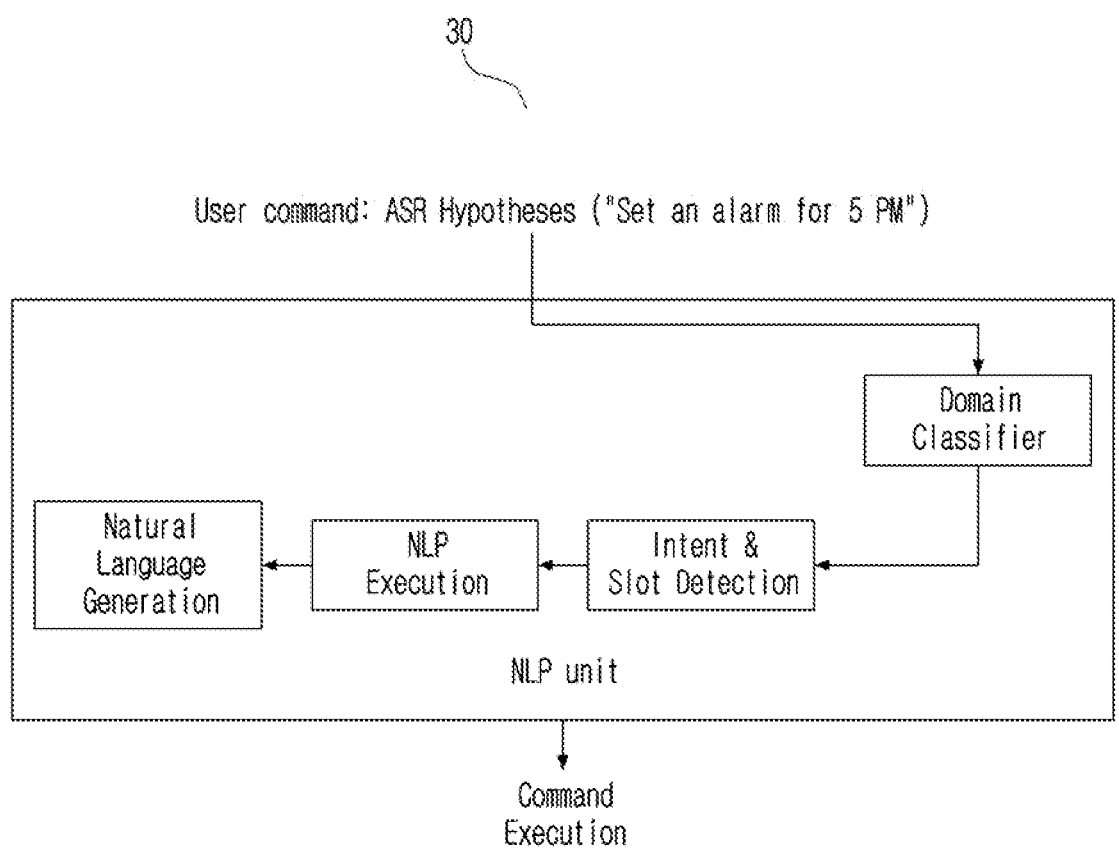
FIG. 3 depicts an NLP pipeline, according to related art.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods for providing an interaction with a virtual assistant. According to an embodiment, an example method includes identifying, by an electronic device, duration of a silence between a first portion of an utterance received from a user and a second portion of the received utterance and a position of the silence in the utterance. Further, the method includes determining, by the electronic device, a contextual relationship between the first portion of the received utterance with the second portion of the received utterance based on the identified duration of the silence and the position of the silence. Further, the method includes determining, by the electronic device, at least one execution criteria between the first portion of the received utterance and the second portion of the received utterance in relation to the determined contextual relationship. Further, the method includes generating, by the electronic device, a response for the received utterance by executing the first portion of the received utterance and the second portion of the received utterance using the at least one determined execution criteria.

Unlike related art methods and systems, the example method can be used to generate the execution criteria by contextual correlation of sub-parts and executing the first portion and the second portion of the received utterance based on the execution criteria such as filtering, augmentation, negation and extension, and thus enhances the NLP execution as per user's desire. The example method can be used to provide better responses to the user. The user will have a way to update the voice commands on the fly, in a single command. The user of the electronic device does not need to give follow up command to get desired results. The method can be used to determine contextual relationship between parts of user's voice command, based on the intermediate silence detection, to enhance responses of virtual assistant, by determining suitable execution criteria such as filtering, augmentation, negation and extension.

The example method can be used to find contextual correlation between sub-parts of the user command and determine execution criteria and enhance the user experience in interaction with voice assistant by identifying relationship between portions of received voice command separated by a silence & thereby eliminates the need for always providing well-structured voice commands in order to obtain required response from the assistant.

In the example method, AI model trained with large data, so as to assist in identification of the meaningful silence, which can create contextual correlation. The unwanted silence's which are not meaningful are eliminated, and thus the accuracy of the response is increased.

In the related art method, the user of the electronic device may say, "virtual assistant Search Notes called shopping". Based on the user input, the user has many notes which will appear in the list. The user needs to give at least one more command to sort the list so that the user can find the exact note. In an example, based on an embodiment, the user of the electronic device can give command like ""Search notes called shopping <silence/pause> recent first"" so that the user can find the exact note. This results in enhancing the voice assistant response. Example scenarios are explained below with respect to FIG. 10 to FIG. 19.

Referring now to the drawings, and more particularly to FIGS. 4 through 26, where similar reference characters denote corresponding features consistently throughout the figures, there are shown example embodiments.

Figure 4:
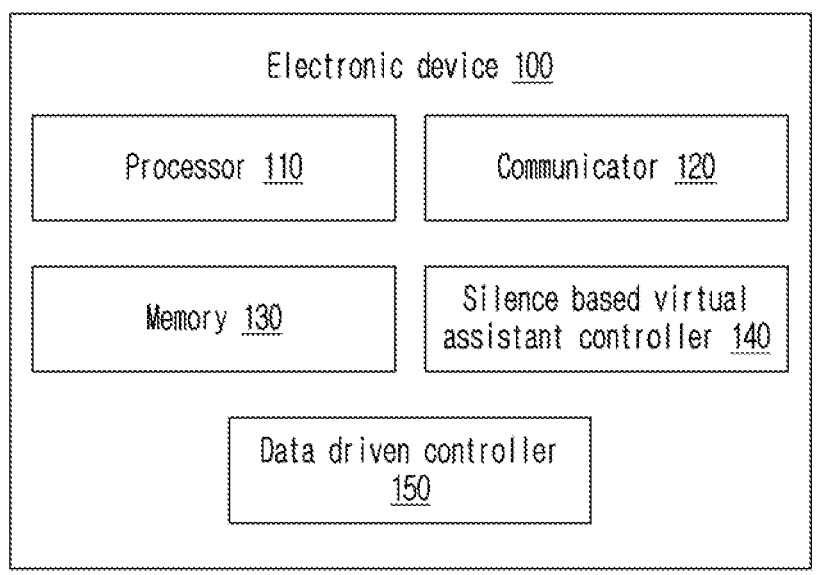
FIG. 4 shows various hardware components of an electronic device, according to an embodiment.

FIG. 4 shows various hardware components of an electronic device (100), according to an embodiment as disclosed herein. The electronic device (100) can be, for example, but is not limited to, a laptop, a desktop computer, a notebook, a Device-to-Device (D2D) device, a vehicle to everything (V2X) device, a smartphone, a foldable phone, a smart TV, a tablet, an immersive device, and an internet of things (IoT) device. In an embodiment, the electronic device (100) includes a processor (110), a communicator (120), a memory (130), a silence based virtual assistant controller (140), and a data driven controller (150). The processor (110) is communicatively coupled with the communicator (120), the memory (130), the silence based virtual assistant controller (140), and the data driven controller (150)

The silence based virtual assistant controller (140) is configured to identify the duration of the silence between the first portion of the utterance received from the user and the second portion of the received utterance, and a position of the silence in the utterance. According to the identified duration of the silence and the position of the silence, the silence based virtual assistant controller (140) is configured to determine the contextual relationship between the first portion and the second portion of the received utterance. The position of the silence corresponds to a time period of silence within an utterance time frame.

Figure 20A:
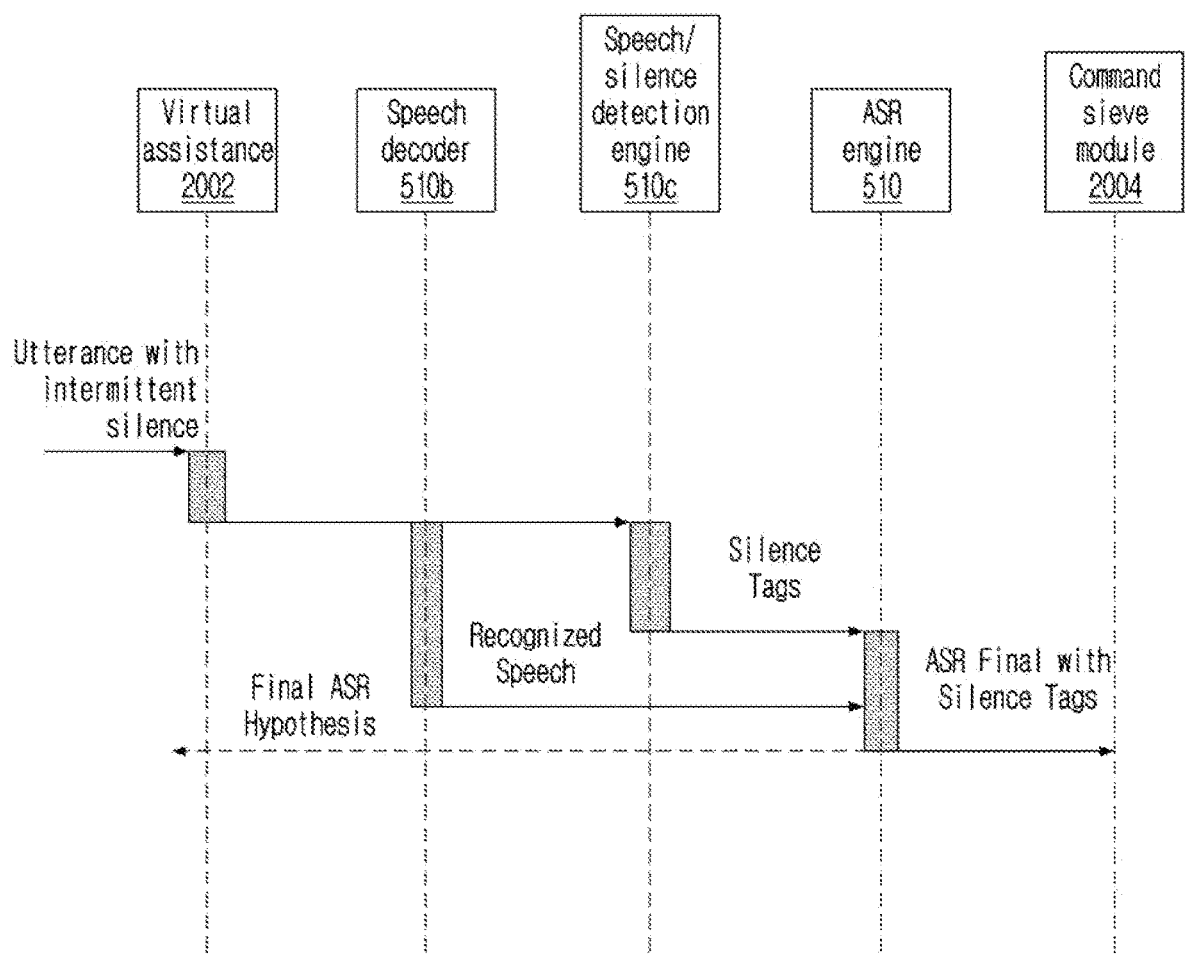
FIGS. 20A to 20B, FIG. 21, and FIG. 22 are example sequence/flow diagram illustrations in which the electronic device performs the contextual analysis and intent/criteria correction dynamically in the complex voice command, according to an embodiment.

In an embodiment, the contextual relationship is determined by segregating at least one part of the user utterance based on at least one duration of the silence between the first portion and the second portion of the received utterance and the position of the silence in the utterance, generating multiple parallel instances of contextual analysis blocks to understand the relationship between the at least one part of the user utterance, transforming multiple sub-part based user utterance into a single executable sentence for NLP. Each of the transformed multiple sub-part based user utterances are marked with confidence score, and the contextual relationship is determined based on the generated multiple parallel instances of contextual analysis blocks. The contextual analysis blocks are executed in parallel for each of the combination of sub-parts generated by a command sieve module (an example of which is shown in FIG. 20A). Each of the contextual analysis blocks is implemented by using a data driven model (e.g., machine learning (ML) model, AI model or the like) having learnt the weights of contextual correlation between multiple sub-parts of the user utterance.

In an embodiment, the contextual relationship is determined by identifying a relationship in the first utterance based on the context of the second utterance, and determining the contextual relationship between the first utterance and the second utterance by using at least one of intent, a slot update, a negation and an enhancement among the identified relationship. The contextual relationship of sub-parts in the utterance to update the intent to optimize the NLP response based on the duration of the silence and the position of the silence.

Further, the silence based virtual assistant controller (140) is configured to determine at least one execution criteria between the first portion of the received utterance and the second portion of the received utterance in relation to the determined contextual relationship. Further, the silence based virtual assistant controller (140) is configured to generate a response for the received utterance by executing the first portion of the received utterance and the second portion of the received utterance using the at least one determined execution criteria. The execution criteria can be, for example, but is not limited to, a filtering criteria, an augmentation criteria, a negation criteria and extension criteria. Example illustrations of the contextual analysis and intent/criteria correction dynamically in the complex voice command during the augmentation criteria are explained in FIG. 10 and FIG. 11F. Example illustrations of the contextual analysis and intent/criteria correction dynamically in the complex voice command during the filtering criteria are explained in FIG. 12 and FIG. 13E.

Figure 14:
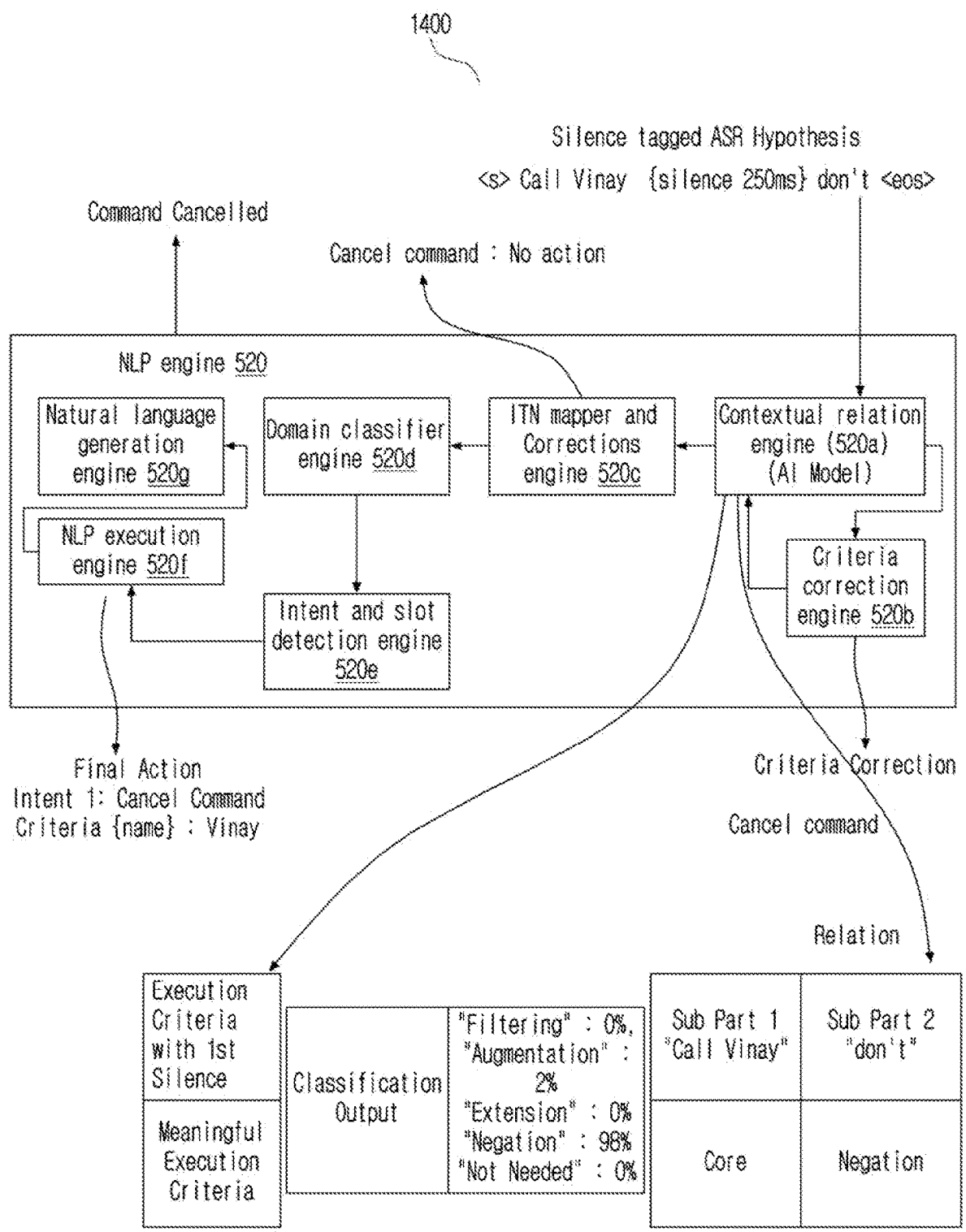
FIG. 14 and FIGS. 15A to 15F are example illustrations in which the electronic device performs the contextual analysis and intent/criteria correction dynamically in the complex voice command during a negation scenario, according to an embodiment.
Figure 15A:
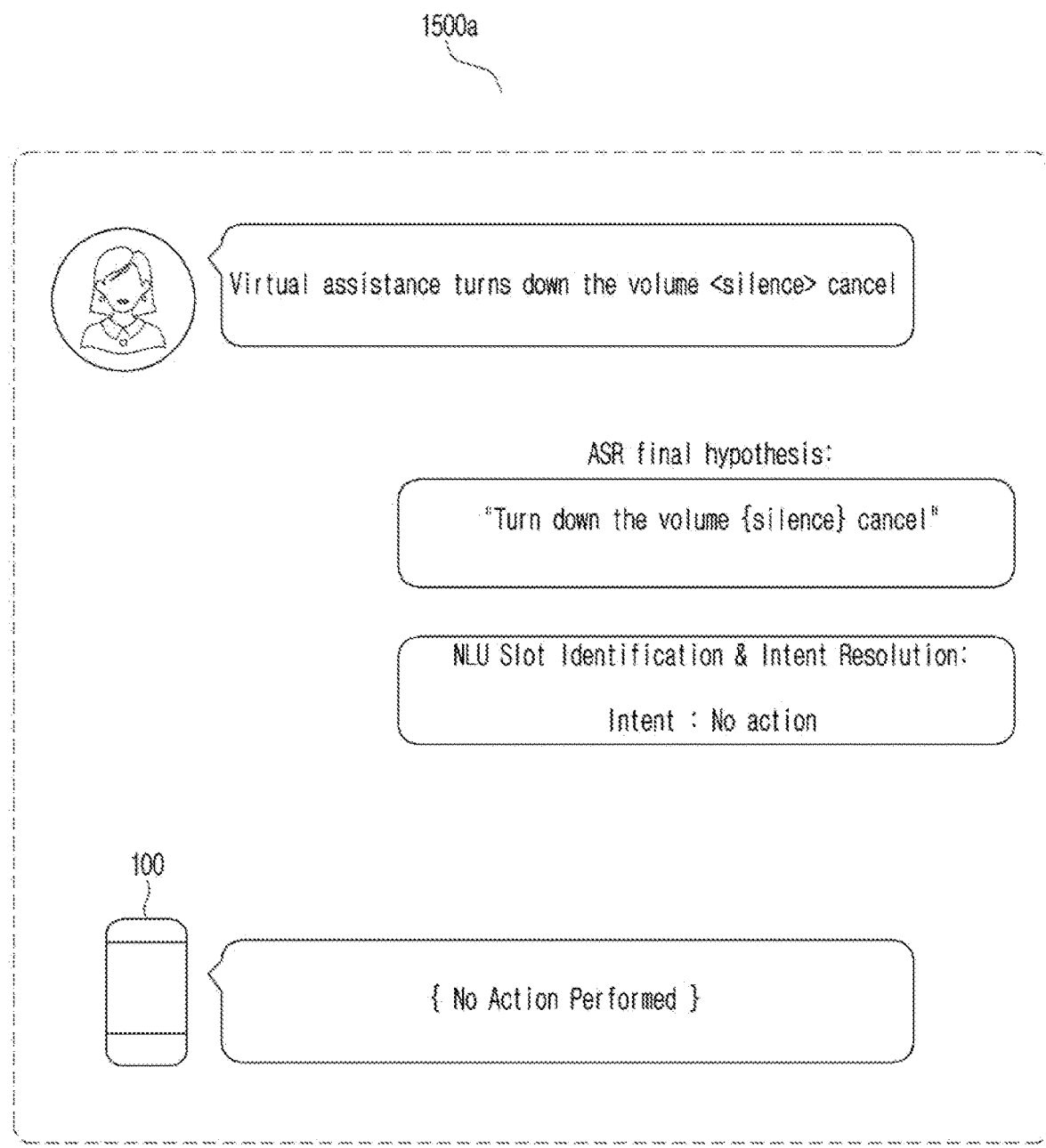
Figure 15B:
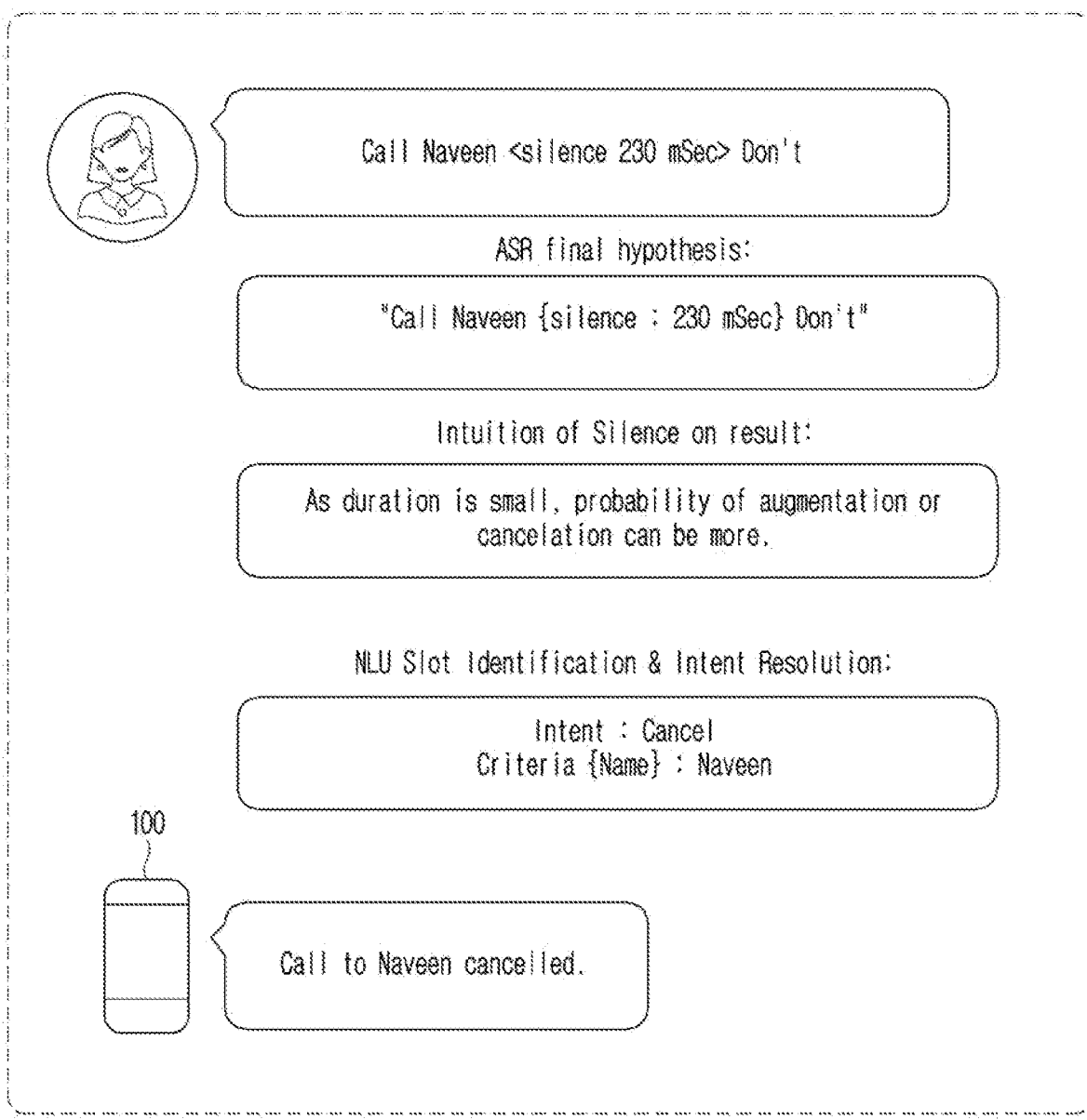
Figure 15C:
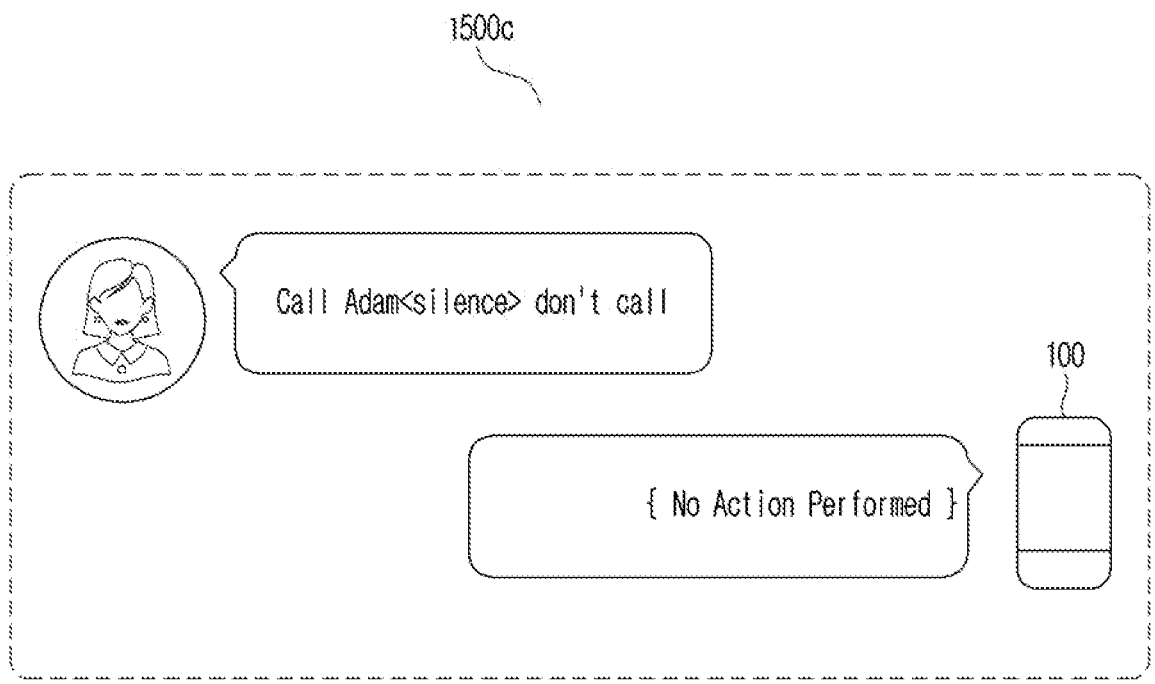
Figure 15D:
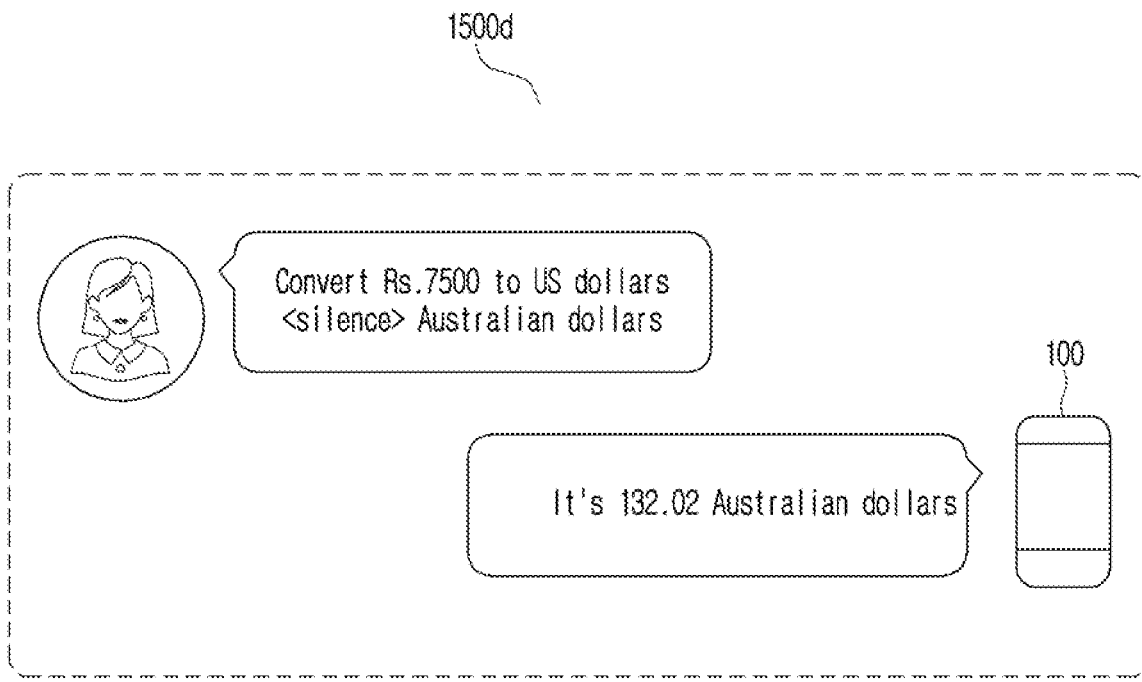
Figure 15E:
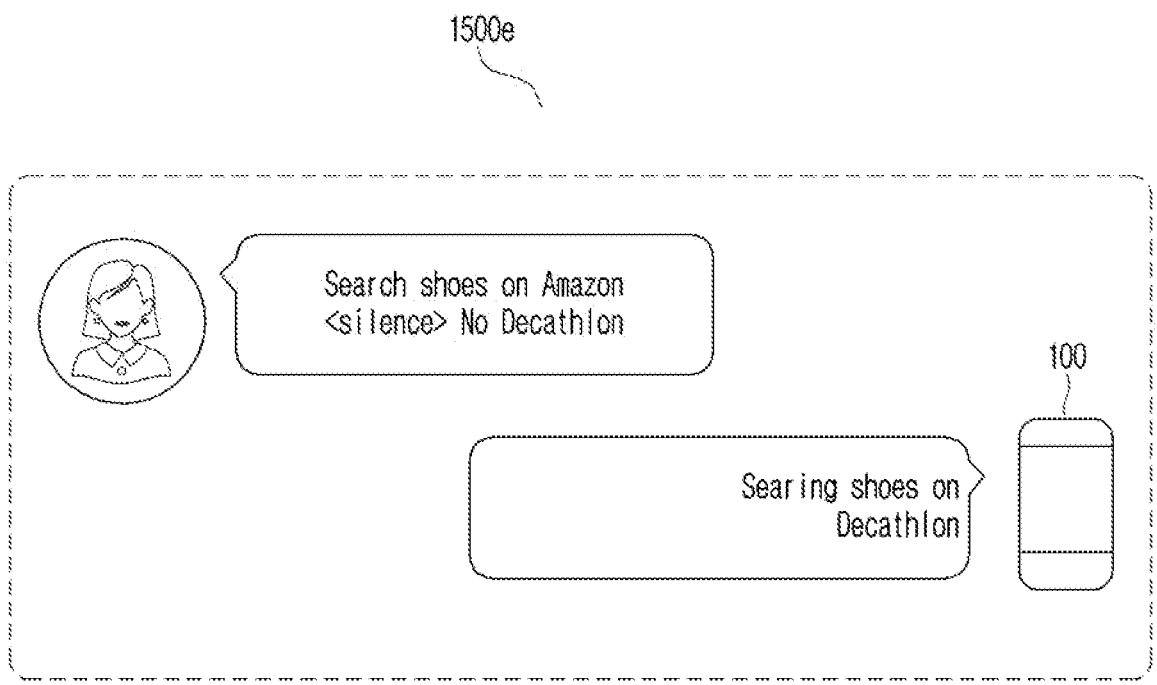
Figure 15F:
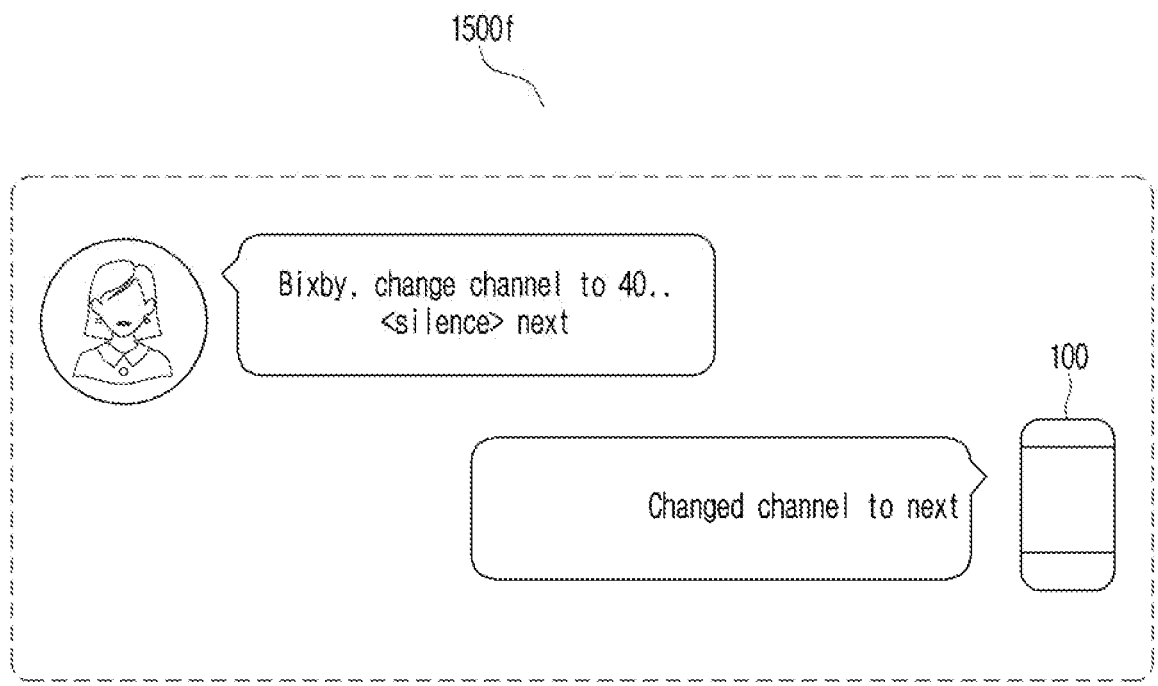

Example illustrations of the contextual analysis and intent/criteria correction dynamically in the complex voice command during the negation criteria are explained in FIG. 14 and FIG. 15F. Example illustrations of the contextual analysis and intent/criteria correction dynamically in the complex voice command during the extension criteria are explained in FIG. 16 and FIG. 17D.

In an embodiment, the execution criteria is determined based on at least one of the duration of the silence between the first portion of the received utterance and the second portion of the received utterance and the position of the silence between the first portion of the received utterance and the second portion of the received utterance.

In an embodiment, the at least one execution criteria is determined using a reinforcement learning the model that learns the user's pattern. The user of the electronic device (100) selects the preferred execution criteria, in case of disambiguation based on user's pattern. For example, if multiple execution criteria are determined, the user may select at least one execution criteria from the multiple execution criteria.

In an embodiment, the execution criteria is determined based on a correlation, for example a correlation between the second portion of the user utterance and the first portion of the user utterance, such that at least one of the second portion of user utterance is a filter to the first portion of the user command, the second portion of user utterance is an augmentation to a criterion or criteria of the first portion of the user command, the second portion of user utterance is a negation of intent to the first portion of the user command, and the second portion of user utterance is an extension of criteria to the first portion of the user command.

In an example, based on an embodiment, if the user of the electronic device (100) has given wrong command, they can cancel it completely or partially such as "Call Sooyeon <silence> cancel". Here, the user of the electronic device (100) realized that they don't want to call so with a silence, and they cancelled it.

In another example, during the command the user realized that the response will have many output values, and the user may want to apply a filter in the same command. Such as, "Call Sejun Park <silence> last called", here the user wants to call Sejun Park, but the user realizes that multiple contacts with the name Sejun Park exist. So the user added "last called" after a silence, to apply filter and execute the command.

In an embodiment, the silence based virtual assistant controller (140) is configured to identify that the first utterance received from the user and the second utterance received from the user are portions of a single voice command. The first utterance and the second utterance are separated by the silence. The silence is beyond the pre-determined time threshold subsequent to the first utterance received from the user. The pre-determined time threshold comprises a range above a first threshold and within a second threshold. By using the silence, the silence based virtual assistant controller (140) is configured to determine the contextual relationship between the portions of the single voice command. Further, the silence based virtual assistant controller (140) is configured to process the single voice command using the determined contextual relationship and at least one execution criteria to generate the response for the single voice command.

In the related art method, for example, the user of the electronic device (100) says to virtual assistant as "Search Notes called shopping". Based on the user input, the user has many notes which will appear in the list. The user needs to give at least one more command to sort the list so that the user can find the exact note. Based on an embodiment, for an example, the user of the electronic device (100) can give command such as "Search notes called shopping <silence/pause> recent first" so that the user can find the exact note. This results in enhancing the voice assistant response.

The silence based virtual assistant controller (140) may be physically implemented by analog or digital circuits such as logic gates, integrated circuits, microprocessors, microcontrollers, memory circuits, passive electronic components, active electronic components, optical components, hardwired circuits, or the like, and may be driven by firmware.

Further, the processor (110) is configured to execute instructions stored in the memory (130) and to perform various processes. Various applications (e.g., virtual assistant application, voice assistant application or the like) are stored in the memory (130). The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model using the data driven controller (150). The data driven controller (150) can be a ML model based controller and AI model based controller. A function associated with the AI model may be performed through the non-volatile memory, the volatile memory, and the processor (110). The processor (110) may include one or a plurality of processors. In embodiments, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU)

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning may mean that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may include a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 4 shows various hardware components of the electronic device (100) it is to be understood that other embodiments are not limited thereto. In other embodiments, the electronic device (100) may include less or more number of components. Further, the labels or names of the components are used only for illustrative purpose and does not limit the scope of the invention. One or more components can be combined together to perform same or substantially similar function in the electronic device (100).

Figure 5:
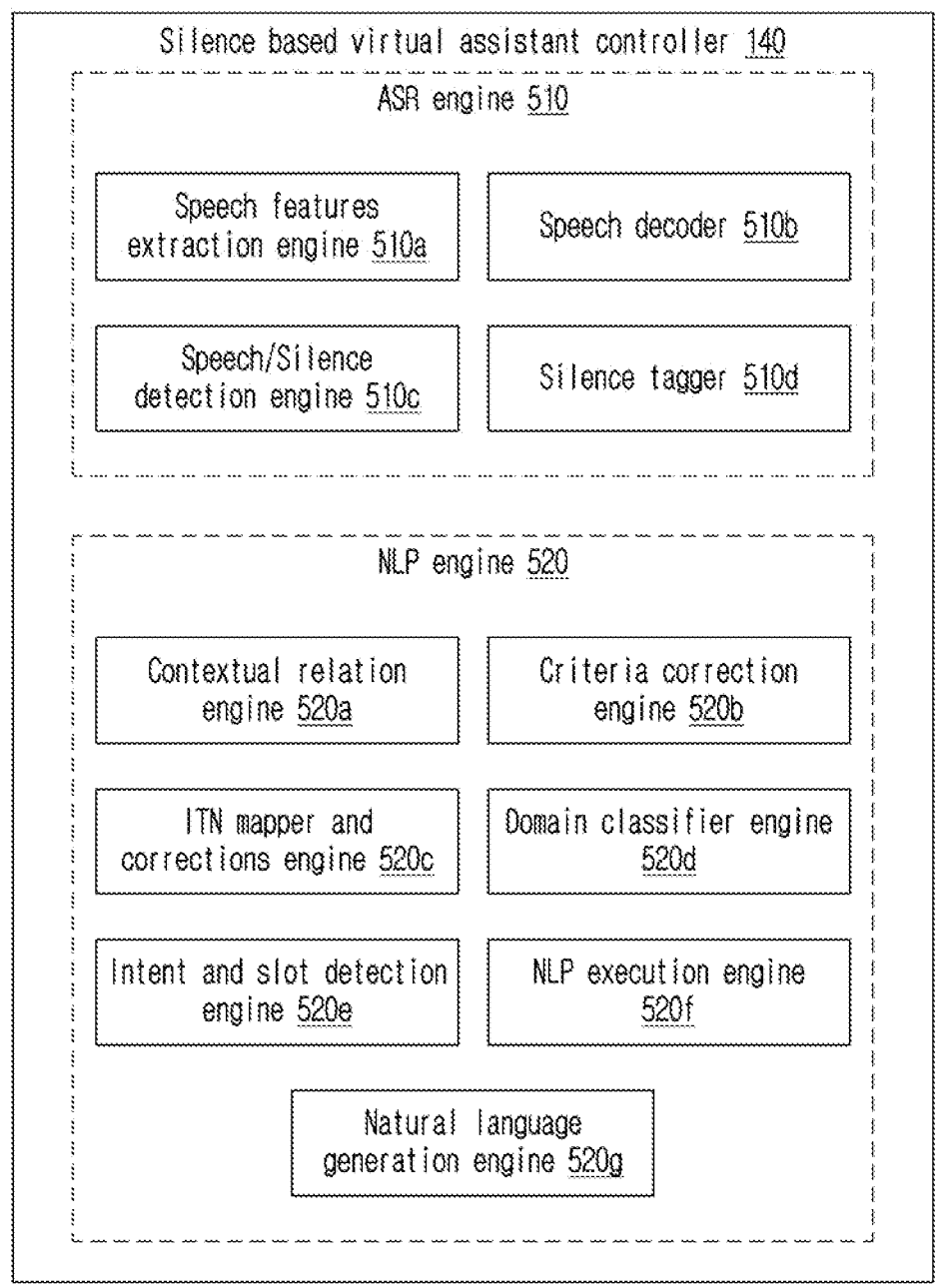
FIG. 5 shows various hardware components of a silence based virtual assistant controller included in the electronic device, according to an embodiment.

FIG. 5 shows various hardware components of the silence based virtual assistant controller (140) included in the electronic device (100), according to an embodiment as disclosed herein. In an embodiment, the silence based virtual assistant controller (140) includes an Automatic Speech Recognition (ASR) engine (510) and an NLP engine (520). The ASR engine (510) includes a speech features extraction engine (510a), a speech decoder (510b), a speech/silence detection engine (510c) and a silence tagger (510d). The NLP engine (520) includes a contextual relation engine (520a), a criteria correction engine (520b), an ITN mapper and corrections engine (520c), a domain classifier engine (520d), an intent and slot detection engine (520e), an NLP execution engine (520f) and a natural language generation engine (520g).

The ASR engine (510) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

The NLP engine (520) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Consider an example in which the user of the electronic device (100) provides the utterance having inherent silence with criteria correction command. Based on the received utterance, the speech decoder (510*b*) transcribes the user speech utterance into the text based on extracted speech features obtained from the speech features extraction engine (510*a*). The speech/silence detection engine (510*c*) and the silence tagger (510*d*) may be referred to together as a voice activity detection (VAD) unit. The VAD unit detects speech and silence in given audio input (utterance) and categorically tags pauses in the speech. The ASR engine (510) produces speech-to-text output with silence tagged information.

Further, the ASR engine (510) shares the speech-to-text output with silence tagged information to the contextual relation engine (520*a*). The contextual relation engine (520*a*) can be an AI model, where the contextual relation engine (520*a*) contextually evaluates multiple sub-parts of the user voice command (to produce a single executable sentence) with the determined criteria of the user command. The contextual relation engine (520*a*) generates the response for the user command based on the determined execution criteria using various modules (e.g., criteria correction engine (520*b*), the ITN mapper and corrections engine (520*c*), the domain classifier engine (520*d*), the intent and slot detection engine (520*e*), the NLP execution engine (520*f*) and the natural language generation engine (520*g*)).

By using the contextual relation engine (520*a*), the training data is generated using various scenarios involving various execution criteria, so that the contextual relation engine (520*a*) helps in execution process. By using a learned classification model, when inputted with ASR final hypothesis text with silence location and durations, the contextual relation engine (520*a*) predicts the execution criteria. The assistant then identifies the execution criteria and thus identifies necessary slots for execution accurately.

The contextual relation engine (520*a*) takes the multi part command along with the silence as the input and determines the execution criteria. The AI model's classification probability helps in determining the execution criteria. If probability is low, then the flow of ASR and NLU may be used.

In an example, if the contextual analysis Sub-part is S1 context S2 or S2 context S1, then the ITN mapper and corrections engine (520*c*) transforms multiple sub-parts based voice command into a single executable sentence for the NLP, where the S1 and S2 represents 'Sub-part 1' and 'Sub-part 2'. The ITN mapper and correction engines (520*c*) uses an attention based sequence to sequence RNN engine used to convert multiple sub-part voice command text into a final single text. The NLP execution engine (520*f*) and the natural language generation engine (520*g*) execute the final single text to generate the response.

Further, the criteria correction engine (520*b*) provides the contextual analysis score and generates consecutive parts of voice command in executable format. The contextual relation engine (520*a*) (which may be, for example, an ML based engine) aware of domain classifier failures in cases where single commands can fail and trigger different domains. In these cases the first generated sub-part is sent to the domain classifier engine (520*d*), a most suitable capsule is selected, and the follow-up action subpart is sent to the selected input for enhanced execution using the intent and slot detection engine (520*e*). Further, ML based sequence generation (e.g., RNN based sequence generation or the like) for follow-up intent and slots is trained and used using the intent and slot detection engine (520*e*) and the contextual relation engine (520*a*).

Although FIG. 5 shows various hardware components of the silence based virtual assistant controller (140) it is to be understood that other embodiments are not limited thereto. In other embodiments, the silence based virtual assistant controller (140) may include less or more number of components. Further, the labels or names of the components are used only for illustrative purpose and does not limit the scope of the invention. One or more components can be combined together to perform same or substantially similar function in the silence based virtual assistant controller (140).

Figure 6:
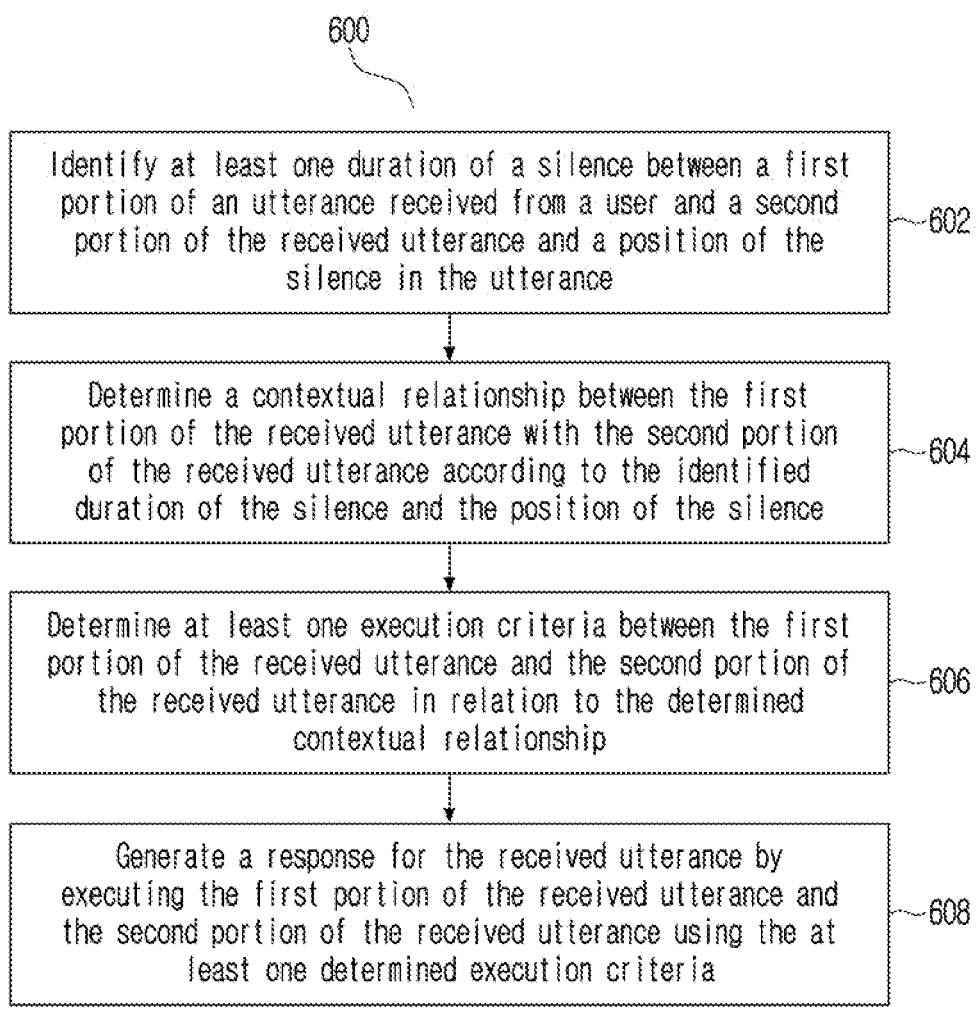
FIG. 6 and FIG. 7 are flow chart illustrating methods for providing the interaction with the virtual assistant, according to an embodiment.
Figure 7:
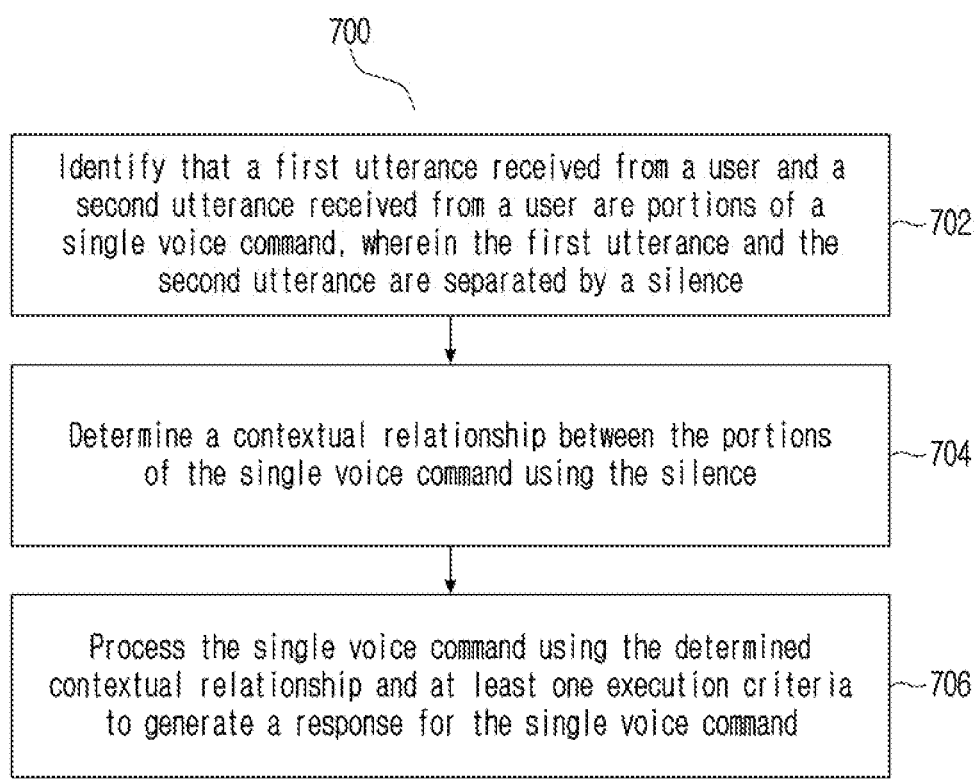

FIG. 6 and FIG. 7 are flow charts (600) and (700) illustrating a method for providing the interaction with the virtual assistant, according to an embodiment as disclosed herein.

Referring to FIG. 6, the operations (602)-(608) are performed by the silence based virtual assistant controller (140). At operation 602, the method includes identifying the duration of the silence between the first portion of the utterance received from the user and the second portion of the received utterance and the position of the silence in the utterance. At operation 604, the method includes determining the contextual relationship between the first portion of the received utterance with the second portion of the received utterance based on the identified duration of the silence and the position of the silence. At operation 606, the method includes determining the at least one execution criteria between the first portion of the received utterance and the second portion of the received utterance in relation to the determined contextual relationship. At operation 608, the method includes generating the response for the received utterance by executing the first portion of the received utterance and the second portion of the received utterance using the at least one determined execution criteria.

Referring to FIG. 7, the operations (702)-(706) are performed by the silence based virtual assistant controller (140). At operation 702, the method includes identifying that the first utterance received from the user and the second utterance received from the user is portions of the single voice command. The first utterance and the second utterance are separated by a silence. At operation 704, the method includes determining the contextual relationship between the portions of the single voice command using the silence. At operation 706, the method includes processing the single voice command using the determined contextual relationship and at least one execution criteria to generate the response for the single voice command.

Unlike related art methods and systems, embodiments can be used to generate the execution criteria by contextual correlation of sub-parts and executing the first portion and the second portion of the received utterance based on the execution criteria such as filtering, augmentation, negation and extension, and thus enhances the NLP execution as per user's desire. Embodiments can be used to provide better responses to the user. The user will have a way to update the voice commands on the fly, in a single command. The user of the electronic device (100) does not need to give follow up command to get desired results. The method can be used to determine contextual relationship between parts of user's voice command, based on the intermediate silence detection, to enhance responses of virtual assistant, by determining suitable execution criteria such as filtering, augmentation, negation and extension.

In an embodiment, AI model trained with large data, so as to assist in identification of the meaningful silence, which can create contextual correlation. The unwanted silence's which are not meaningful are eliminated, and thus the accuracy of the response is increased.

Embodiments can be used to find contextual correlation between sub-parts of the user command and determine execution criteria and enhance the user experience in interaction with voice assistant by identifying relationship between portions of received voice command separated by a silence & thereby eliminates the need for always providing well-structured voice commands in order to obtain required response from the assistant.

Figure 8:
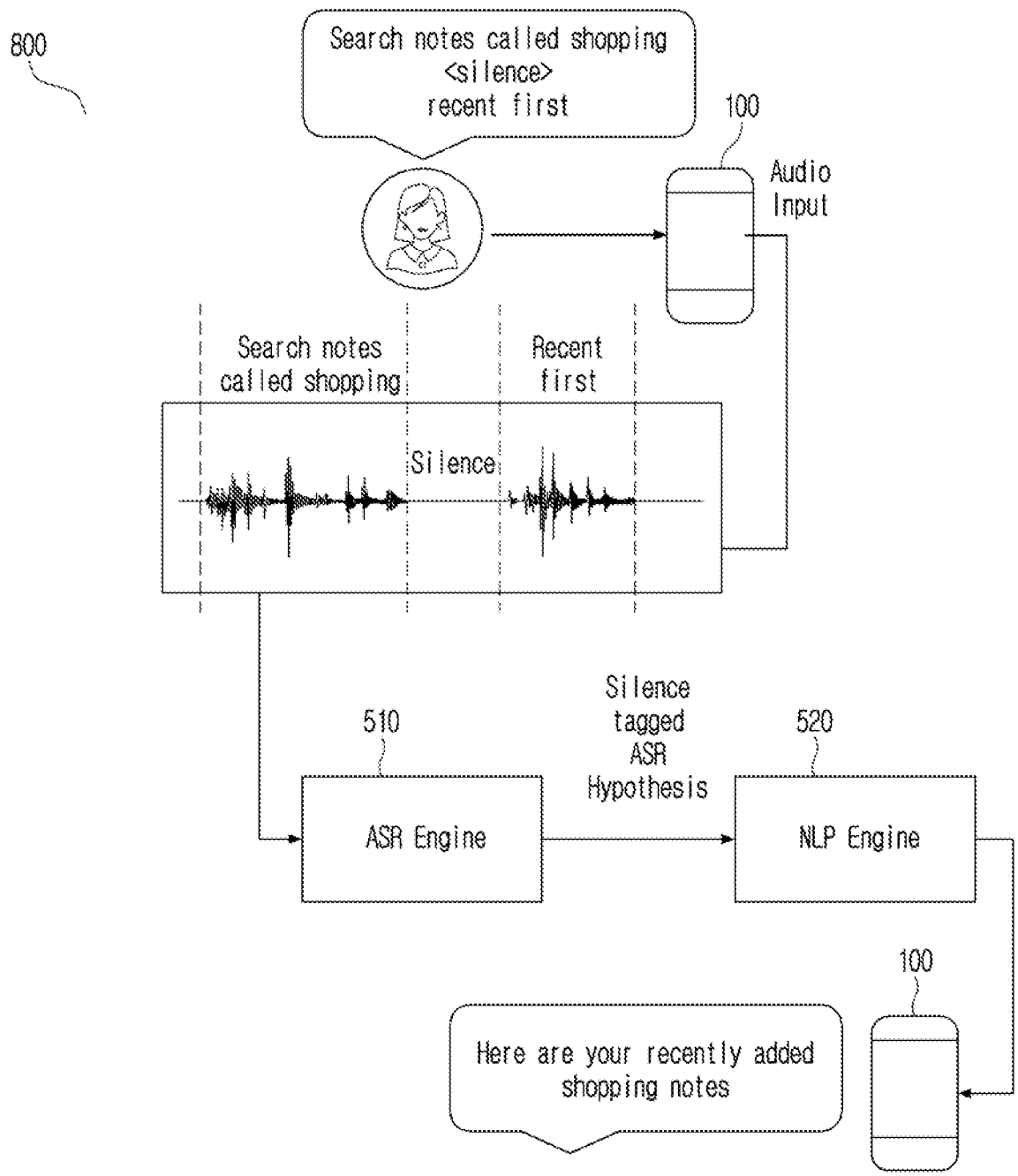
FIG. 8 is an example illustration in which the electronic device performs a contextual analysis and intent/criteria correction dynamically in a complex voice command, according to an embodiment.

FIG. 8 is an example illustration (800) in which the electronic device (100) performs the contextual analysis and intent/criteria correction dynamically in the complex voice command, according to an embodiment as disclosed herein.

In an example, the user of the electronic device (100) provides the utterance having the inherent silence with the criteria correction command. The speech decoder (510b) transcribes the user speech utterance into text, based on extracted speech features from the speech features extraction engine (510a). Further, the VAD unit will detect speech and silence in given audio input (utterance) and categorically tags pauses in the speech. The ASR engine (510) produces speech-to-text output with silence tagged info. The contextual relation engine (520a) contextually evaluates multiple sub-parts of a user voice command (to produce a single executable sentence) with the determined criteria of the user command. The contextual relation engine (520a) generates the response for the user command based on the determined execution criteria.

Figure 9:
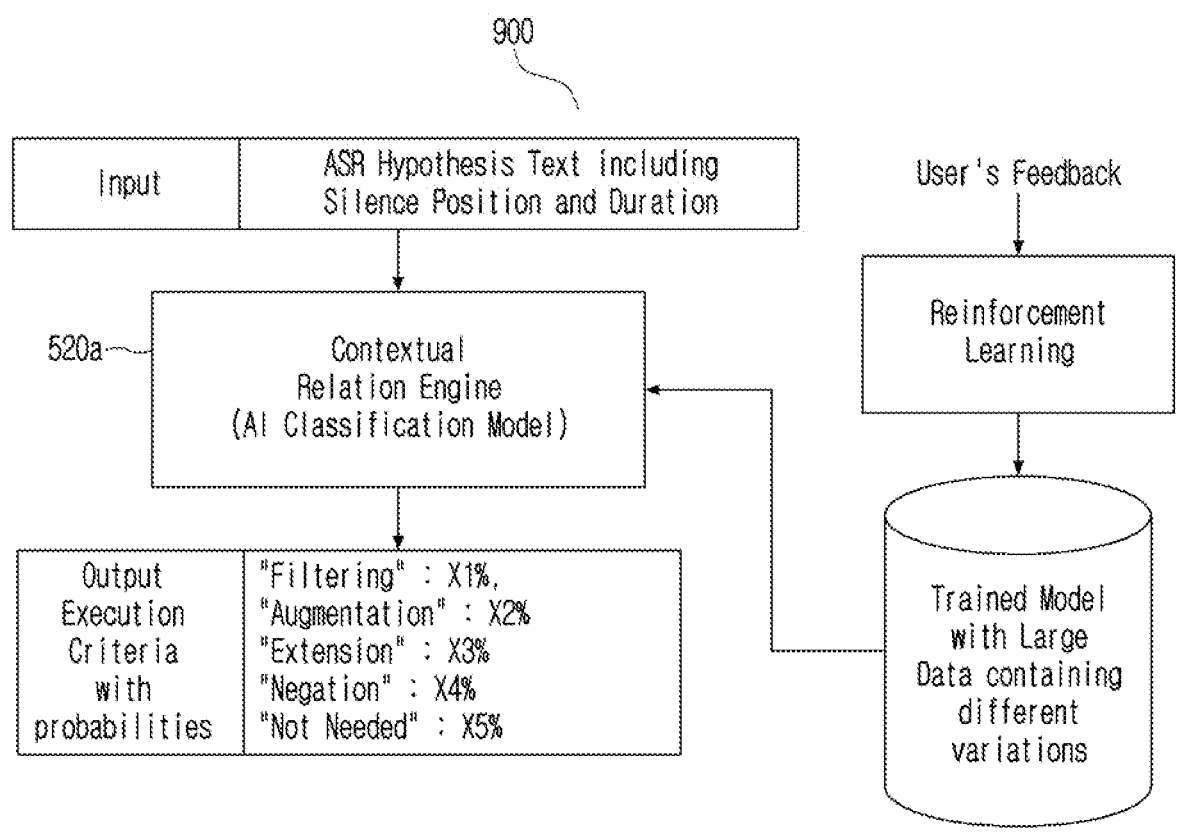
FIG. 9 is an example illustration in which an artificial intelligence (AI) classification model input and output operation is depicted, according to an embodiment.

FIG. 9 is an example illustration (900) in which an AI classification model input and output operation is depicted, according to an embodiment as disclosed herein. When the user of the electronic device (100) wants to dynamically update the execution criteria, the selection of execution criteria becomes very important for accurate execution of the command. Based on an embodiment, the AI model takes the multi part command along with the silence as the input, and determines the execution criteria. It can be of multiple different types. The AI model's classification probability will help in determining the execution criteria. If probability is low, then the flow of ASR engine (510) and the NLP engine (520) may be used.

Further, the execution criteria may decide the implementation flow in the NLP engine (520). Using reinforcement learning the model learns the user's pattern. The user can select preferred execution criteria, in case of disambiguation.

Figure 10:
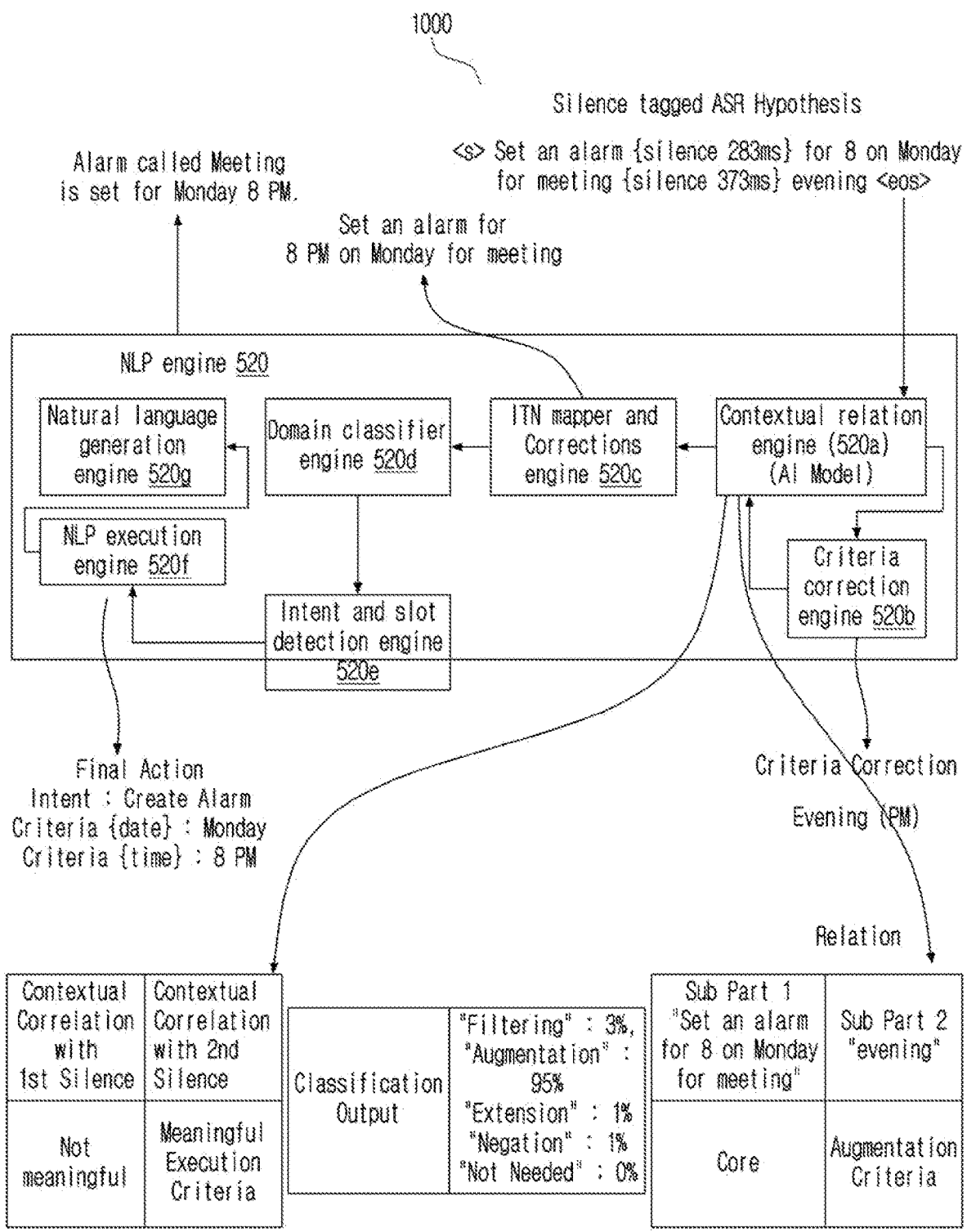
FIG. 10 and FIGS. 11A-11F are example illustrations in which the electronic device performs the contextual analysis and intent/criteria correction dynamically in the complex voice command during an augmentation scenario, according to an embodiment.
Figure 11A:
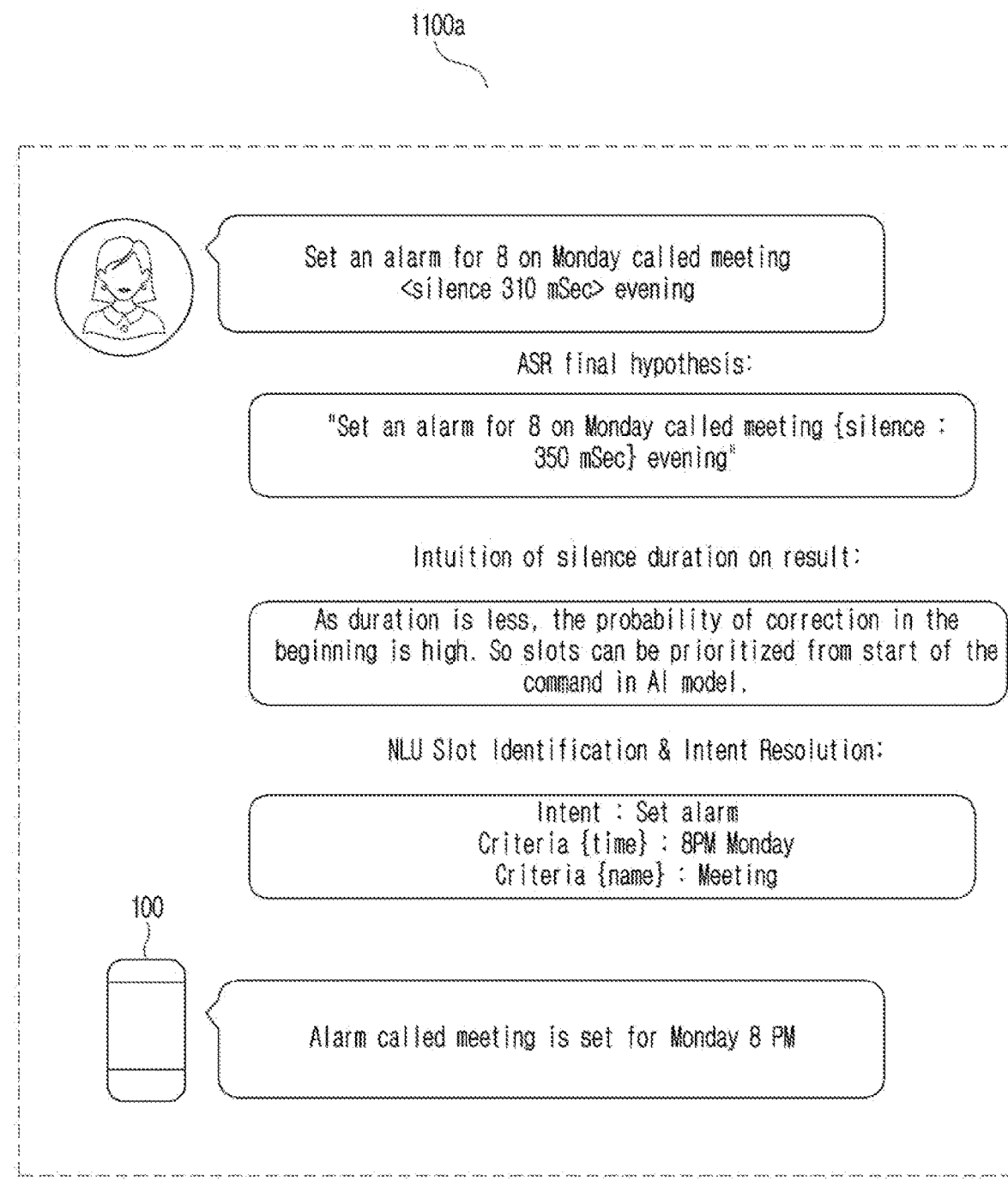
Figure 11B:
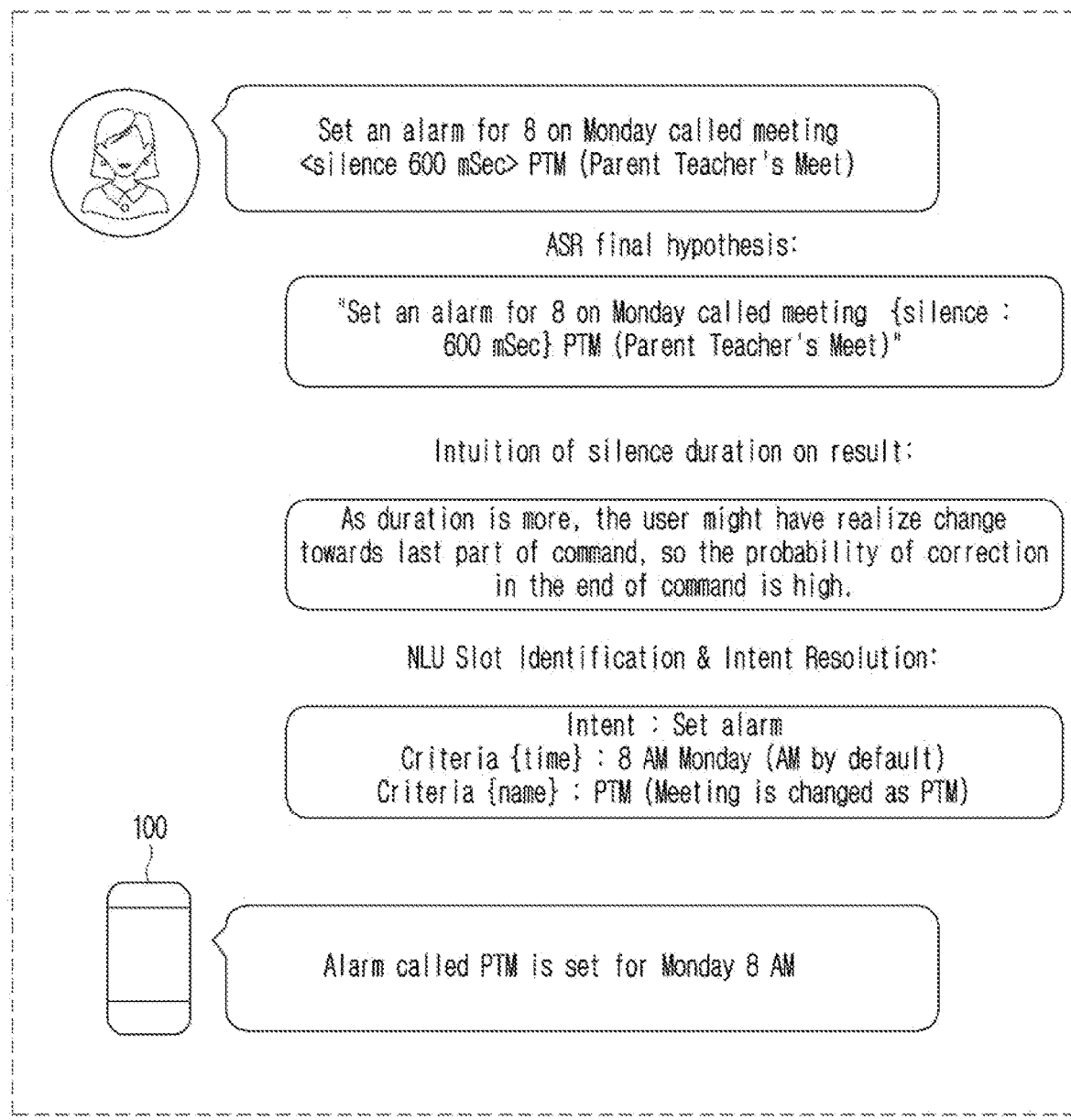
Figure 11C:
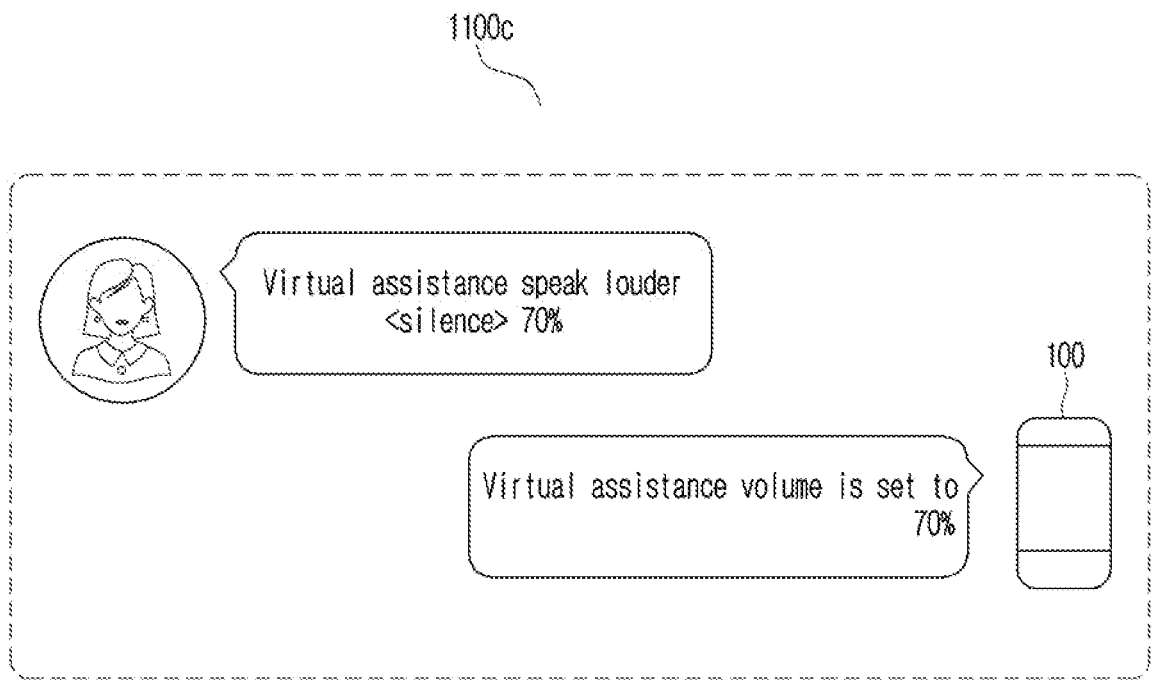
Figure 11D:
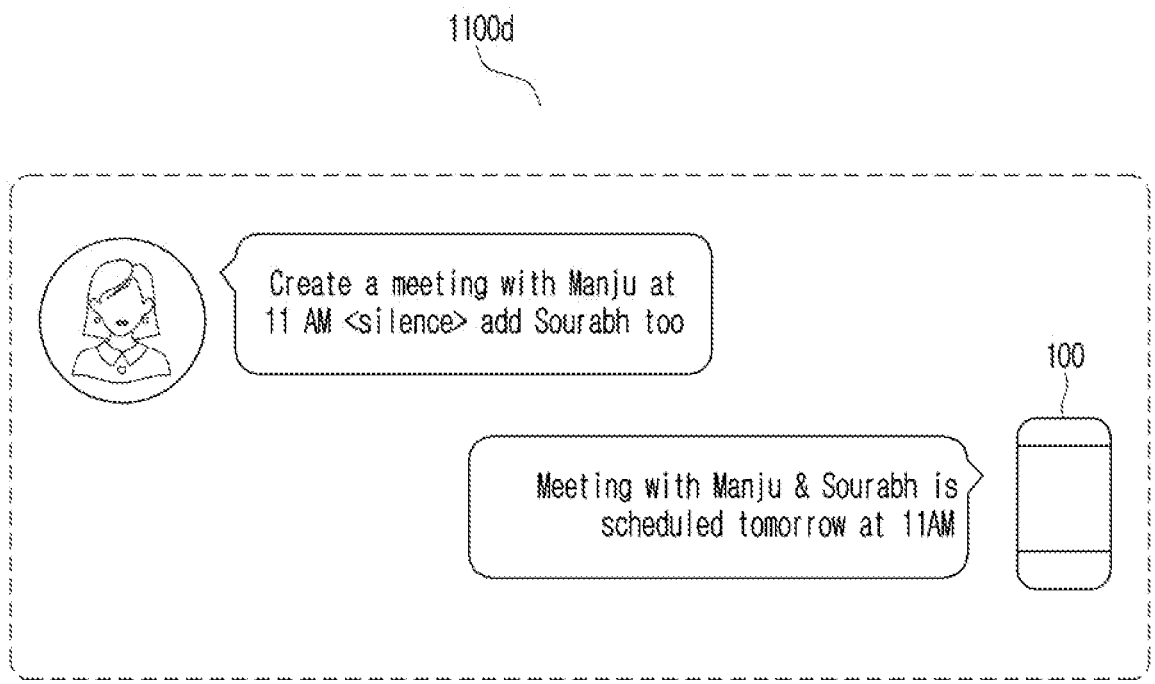
Figure 11E:
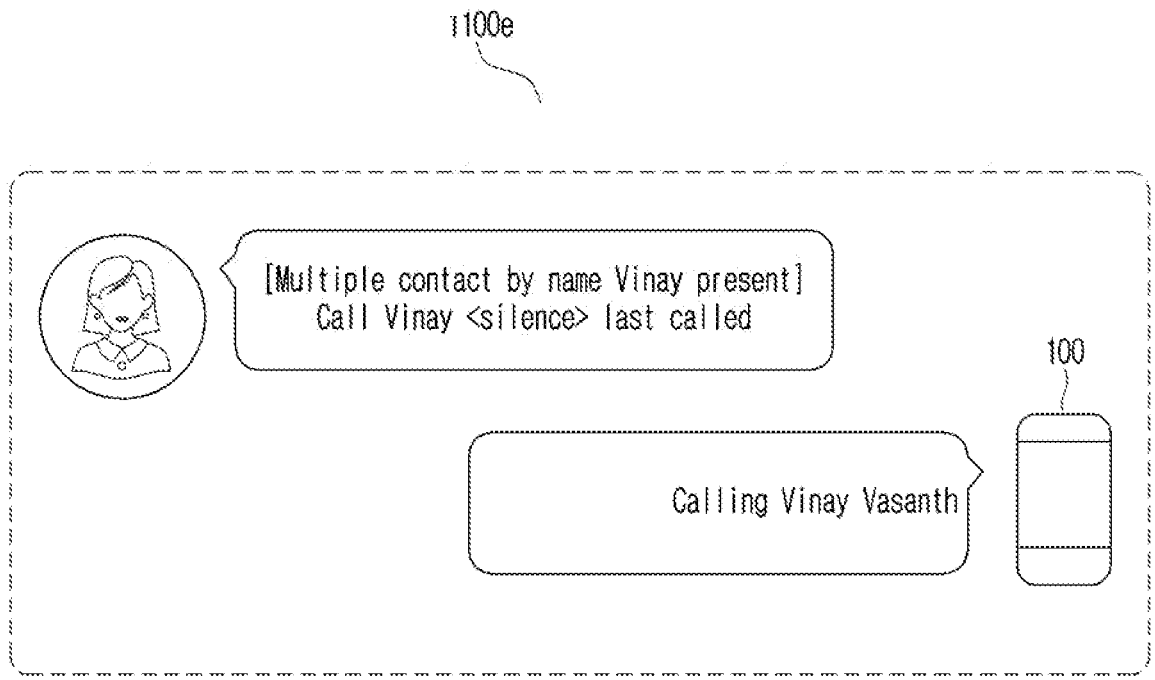
Figure 11F:
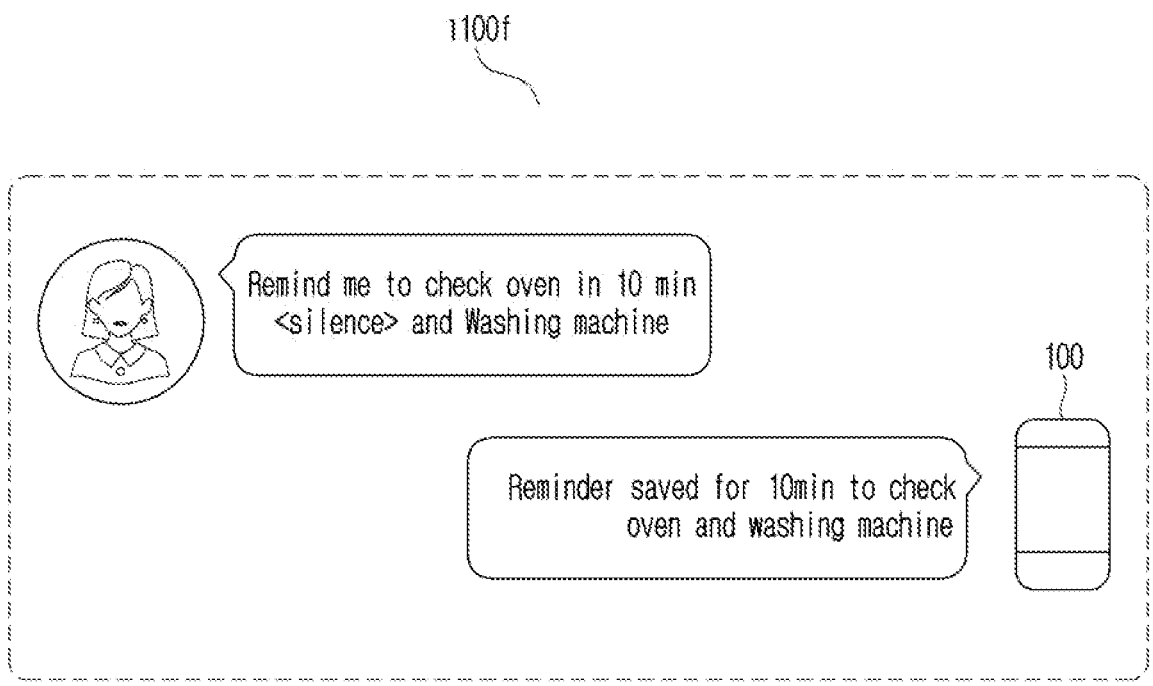

FIG. 10 through FIG. 11F are example illustrations 1000-1100f in which the electronic device (100) performs the contextual analysis and intent/criteria correction dynamically in the complex voice command during the augmentation scenario, according to an embodiment as disclosed herein.

In an example, the user of the electronic device (100) may miss certain input in the voice command and want to correct it, in case of augmentation, the user of the electronic device (100) is updating the missed/incorrect slots in his/her voice command. The correlation suggests the execution criteria and command is executed by the NLP engine (520). In the virtual assistant, it can be completed in one command with criteria correction.

Referring to FIG. 10, consider an example, the virtual assistant of the electronic device (100) receives the user utterance as "Set an alarm <silence> for eight on Monday called meeting<silence> evening". Based on an embodiment, the final ASR hypothesis will be "Set an alarm {silence 283 ms} for 8 on Monday called meeting {silence 357 ms} evening. The contextual relation engine (520a) determines that the contextual correlation with the first silence is not meaningful and the contextual correlation with the second silence is meaningful, including the execution criteria in which the main execution criteria can be the augmentation criteria. The ITN mapper and corrections engine (520c) generates the utterance as "Set an alarm for 8 PM on Monday for called meeting" in which Intent is Create Alarm, Criteria {date} is Monday, Criteria {time} is 8 PM (evening), and Criteria {name} is Meeting. Based on the determination, the virtual assistant of the electronic device (100) responds as "Alarm called Meeting is set for Monday 8 PM". In an embodiment, because of the consideration of appropriate *meaningful silence* position, all the criteria are successfully identified without any sort of assumption by the contextual relation engine (520a).

In another example, the user of the electronic device (100) can realize, during the command, that the user needs criteria correction, filtering in results etc. The user of the electronic device (100) can see the ASR output on a screen or the user of the electronic device (100) can realize in mind that the user wants to update the on-going user speech command. Accordingly, the duration of silence before command correction will also vary depending on position in the on-going speech command during which the user decides to modify/update/negate the criteria. In an example, if execution criteria update is at the start of the command, then silence duration will be smaller. On the other hand, if it is at the end of the command, then silence duration will be longer. This can be trained with speech style of various user's across demographics. Further, based on this, the correction entities can also be prioritized from start of the command in AI model.

Referring to FIG. 11A, as shown in example illustration 1100a, the virtual assistant of the electronic device (100) receives the user utterance as "Set an alarm for 8 on Monday called meeting <silence 310 mSec> evening" Based on the received user utterance, the ASR final hypothesis will be "Set an alarm for 8 on Monday called meeting {silence: 350 mSec} evening" and as silence duration is less, the probability of correction in the beginning is high, so that slots can be prioritized from start of the command in the AI model and NLU Slot Identification and Intent Resolution will be "Intent: Set alarm, Criteria {time}8PM Monday, and Criteria {name}: Meeting. Based on the determination, the virtual assistant of the electronic device (100) responds with "Alarm called meeting is set for Monday 8 PM"

Referring to FIG. 11B, as shown in example illustration 1100b, for an example, the virtual assistant of the electronic device (100) receives the user utterance as "Set an alarm for 8 on Monday called meeting <silence 600 mSec> PTM (Parent Teacher's Meet)". Based on the received user utterance, the ASR final hypothesis will be "Set an alarm for 8 on Monday called meeting {silence: 600 mSec}PTM (Parent Teacher's Meet)". As duration is more, the user might have realize change towards last part of command, so the probability of correction in the end of command is high and the NLU Slot Identification & Intent Resolution will be "Intent: Set alarm, Criteria {time}: 8 AM Monday (AM by default) and Criteria {name}: PTM (Meeting is changed as PTM)". Based on the determination, the virtual assistant of the electronic device (100) responds with "Alarm called PTM is set for Monday 8 AM".

In another example, the virtual assistant of the electronic device (100) receives the user utterance as "Call Naveen <silence 230 mSec> Don't". Based on an embodiment, ASR final hypothesis will be "Call Naveen {silence: 230 mSec}Don't". As duration is small, probability of augmentation or cancelation can be more and the NLU Slot Identification and Intent Resolution will be "intent: Cancel and Criteria {Name}: Naveen". Based on the determination, the virtual assistant of the electronic device (100) responds with "Call to Naveen cancelled".

Similarly, in another example, referring to FIG. 11C, as shown in example illustration 1100c, the virtual assistant of the electronic device (100) receives the user utterance as "Virtual assistant speak louder <silence> 70%". Based on an embodiment, the virtual assistant of the electronic device (100) responds with "Virtual assistant volume is set to 70%"

Similarly, in another example, referring to FIG. 11D, as shown in example illustration 1100d, the virtual assistant of the electronic device (100) receives the user utterance as "Create a meeting with Manju at 11 AM<silence> add Sourabh too". Based on an embodiment, the virtual assistant of the electronic device (100) responds with "Meeting with Manju & Sourabh is scheduled tomorrow at 11AM"

Similarly, in another example, referring to FIG. 11E, as shown in example illustration 1100e, the virtual assistant of the electronic device (100) receives the user utterance as "Call Vinay <silence> last called". Based on an embodiment, the virtual assistant of the electronic device (100) responds with "Calling Vinay Vasanth"

Similarly, in another example, referring to FIG. 11f, as shown in example illustration 1100f, the virtual assistant of the electronic device (100) receives the user utterance as "Remind me to check oven in 10 min <silence> and Washing machine". Based on an embodiment, the virtual assistant of the electronic device (100) responds with "Reminder saved for 10 min to check oven and washing machine"

Figure 12:
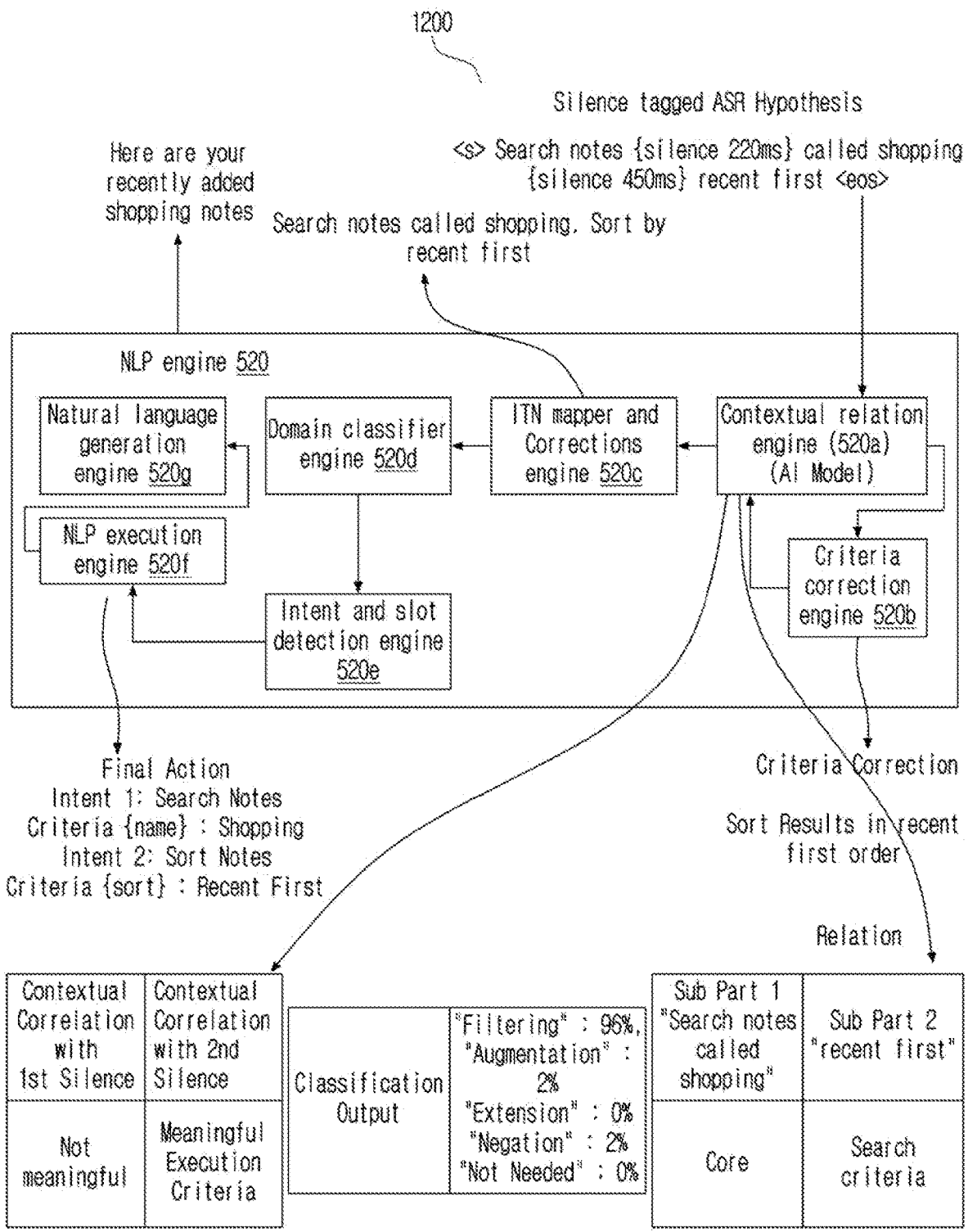
FIG. 12 and FIGS. 13A to 13E are example illustrations in which the electronic device performs the contextual analysis and intent/criteria correction dynamically in the complex voice command during a filtering scenario, according to an embodiment.
Figure 13A:
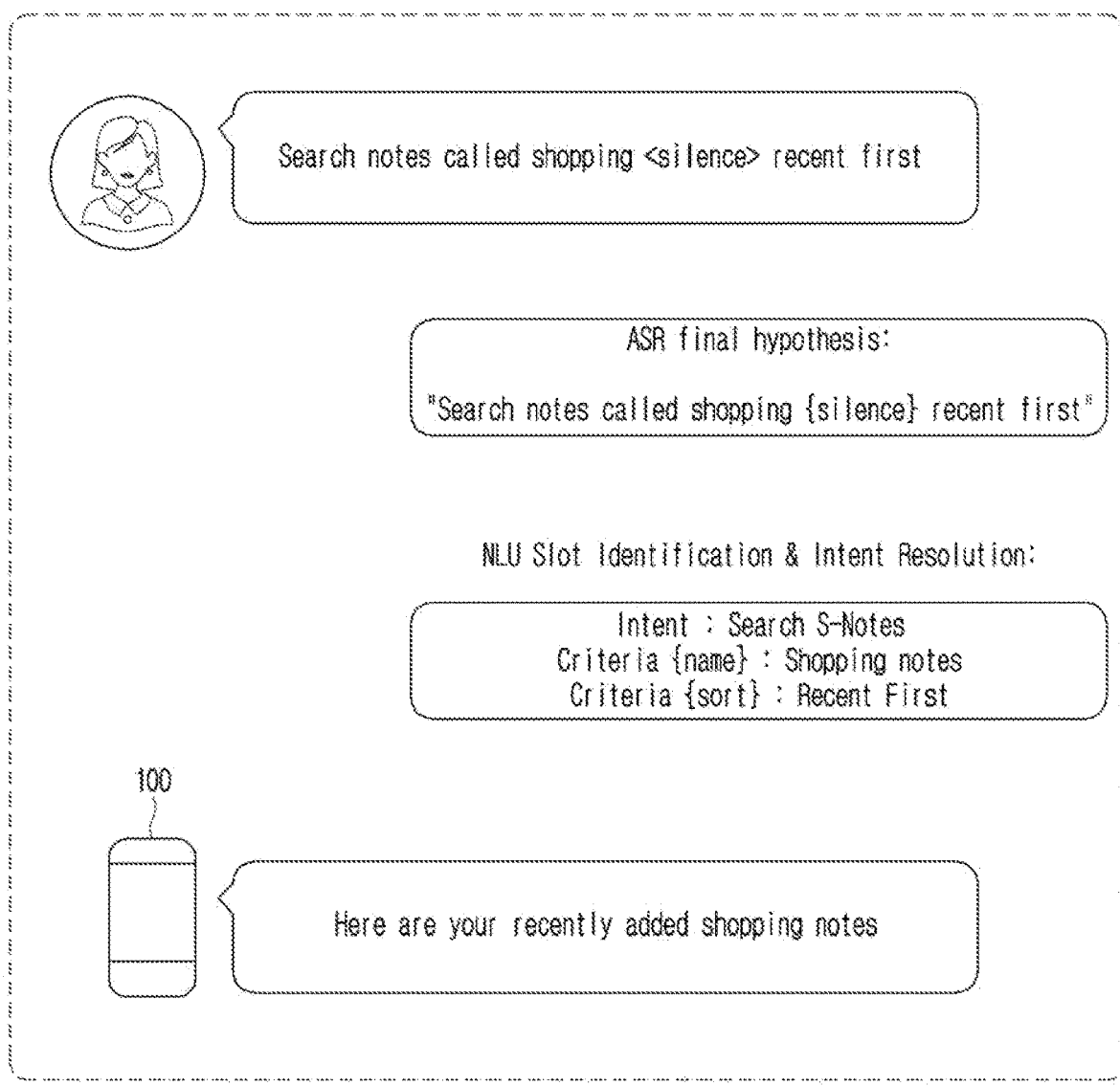
Figure 13B:
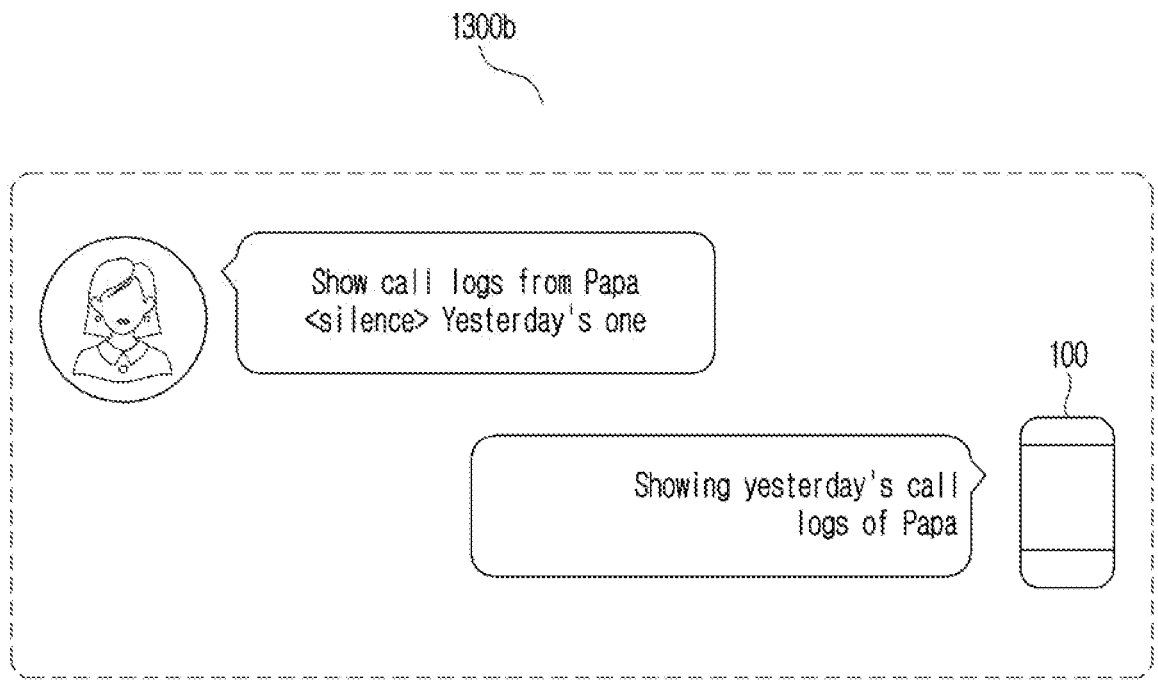
Figure 13C:
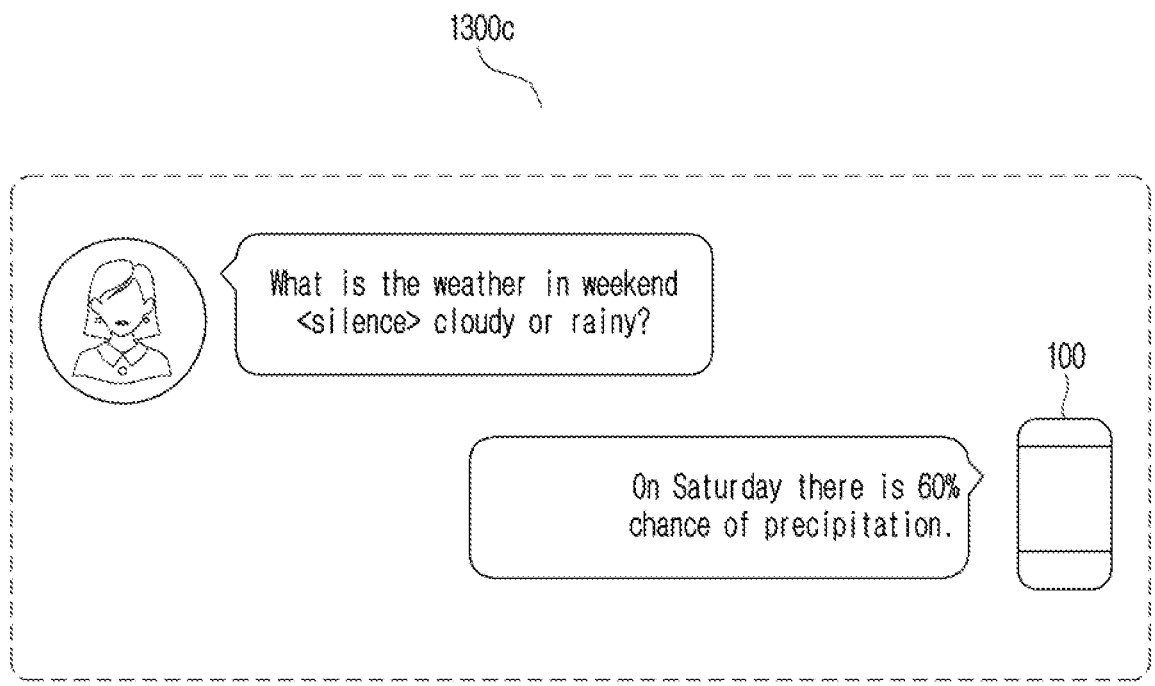
Figure 13D:
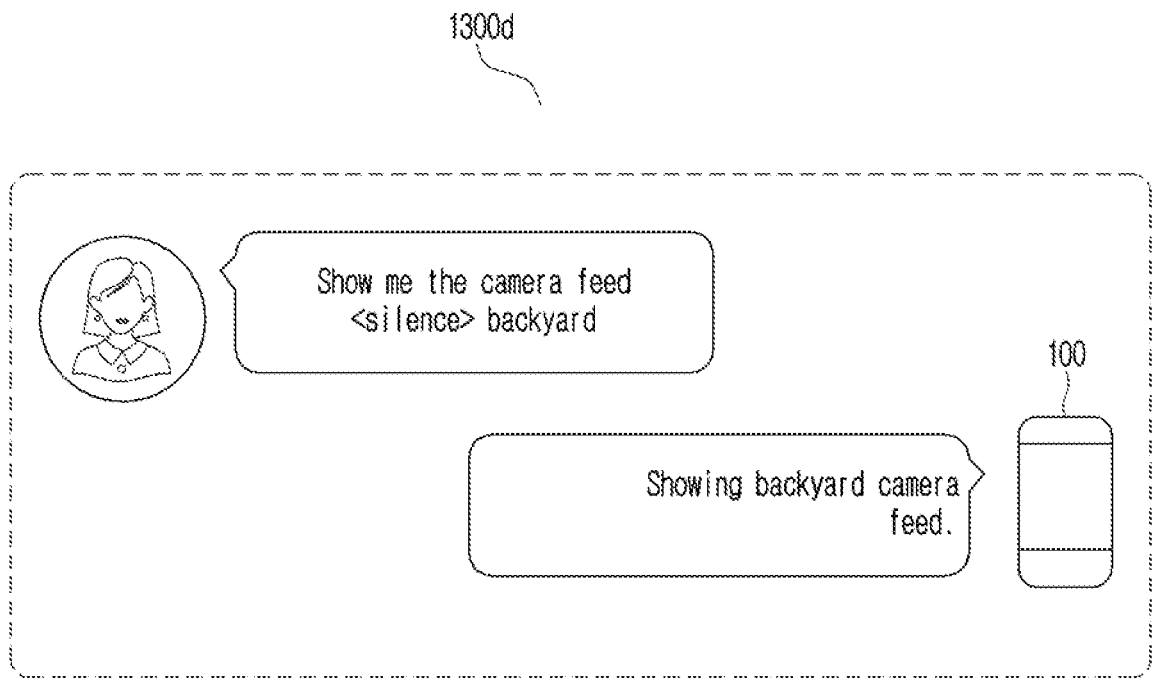
Figure 13E:
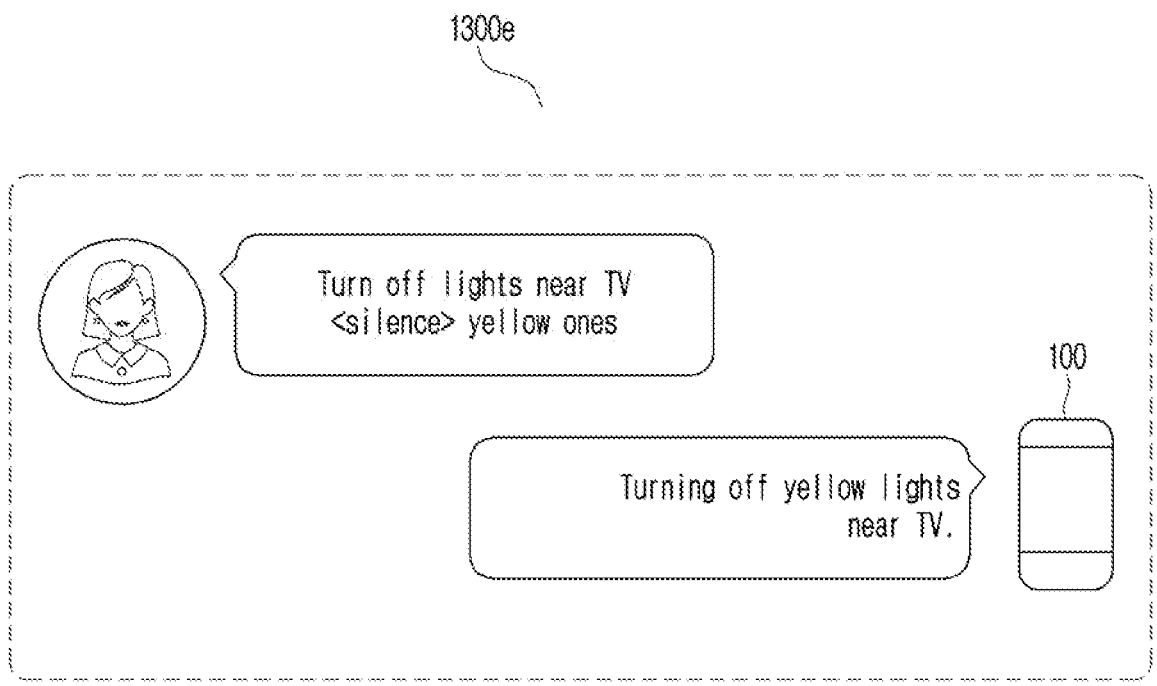

FIG. 12 through FIG. 13E are example illustrations 1200-1300e in which the electronic device (100) performs the contextual analysis and intent/criteria correction dynamically in the complex voice command during the filtering scenario, according to an embodiment as disclosed herein.

As shown in FIG. 12, the user of the electronic device (100) realizes during the command, that results can be many, so the user of the electronic device (100) want to apply filtering in the results. In an example, Search notes called shopping <silence> recent first. In the voice assistant, it will be executed as 2 intent, first intent is search, slot is "shopping", so the shopping notes are searched, next intent is sort and slot is recent first, so the result list of notes is now sorted in recent first order.

Referring to FIG. 12, consider an example in which the virtual assistant of the electronic device (100) receives the user utterance as "Search notes called shopping <silence> recent first". Based on an embodiment, the final ASR hypothesis will be "<s> Search notes {silence 220 ms}called shopping {silence 450 ms}recent first <eos>". The contextual relation engine (520a) determines that the contextual correlation with the first silence is not meaningful and the contextual correlation with the second silence is meaningful including the execution criteria in which the main execution criteria is filtering. The ITN mapper and corrections engine (520c) generates the utterance as "Search notes called shopping. Sort by recent first" in which Intent is Intent 1: Search Notes, Criteria {name}: Shopping, Intent 2: Sort Notes, and Criteria {sort}: Recent First. Based on the determination, the virtual assistant of the electronic device (100) responds with "Here are your recently added shopping notes".

As shown in FIG. 13A, the virtual assistant of the electronic device (100) receives the user utterance as "Search notes called shopping <silence> recent first". Based on the received user utterance, the ASR final hypothesis will be "Search notes called shopping {silence}recent first" and NLU Slot Identification & Intent Resolution will be "Intent: Search S-Notes, Criteria {name}: Shopping notes and Criteria {sort}: Recent First. Based on the determination, the virtual assistant of the electronic device (100) responds with "Here are your recently added shopping notes. Embodiments may correctly identify the contextual relation between two sub-parts of user utterance and sorts results with recent first.

Similarly, in another example, referring to FIG. 13B, as shown in example illustration 1300b, the virtual assistant of the electronic device (100) receives the user utterance as "Show call logs from Papa <silence> Yesterday's one". Based on an embodiment, the virtual assistant of the electronic device (100) responds with "Showing yesterday's call logs of Papa"

Similarly, in another example, referring to FIG. 13C, as shown in example illustration 1300c, the virtual assistant of the electronic device (100) receives the user utterance as "What is the weather in weekend <silence> cloudy or rainy?". Based on an embodiment, the virtual assistant of the electronic device (100) responds with "On Saturday there is 60% chance of precipitation."

Similarly, in another example, referring to FIG. 13D, as shown in example illustration 1300d, the virtual assistant of the electronic device (100) receives the user utterance as "Show me the camera feed <silence> backyard". Based on an embodiment, the virtual assistant of the electronic device (100) responds with "showing backyard camera feed."

Similarly, in another example, referring to FIG. 13E, as shown in example illustration 1300e, the virtual assistant of the electronic device (100) receives the user utterance as "Turn off lights near TV<silence> yellow ones". Based on an embodiment, the virtual assistant of the electronic device (100) responds with "Turning off yellow lights near TV"

FIG. 14 through FIG. 15F are example illustrations 1400-1500f in which the electronic device (100) performs the contextual analysis and intent/criteria correction dynamically in the complex voice command during the negation scenario, according to an embodiment as disclosed herein.

Referring to FIG. 14, consider an example, the virtual assistant of the electronic device (100) receives the user utterance as "Call Vinay (silence) don't". Based on an embodiment, the final ASR hypothesis will be "<s> Call Vinay {silence 250 ms}don't<eos>" wherein <S> refers to start and <eos> refers to end of sentence. The contextual relation engine (520a) determines that the contextual correlation with the first silence is meaningful including the execution criteria in which the main execution criteria is negation" in which Intent is Intent 1: Cancel Command and Criteria {name}: Vinay. Based on the determination, the virtual assistant of the electronic device (100) responds with "no action (i.e., Command Cancelled)". In the negation execution criteria, the first command can be completely or partially cancelled by the user, so that the voice assistant should need to handle accordingly, and show proper response to the user.

As shown in FIG. 15A, as shown in example illustration 1500b, the virtual assistant of the electronic device (100) receives the user utterance as "Virtual assistant turns down the volume <silence> cancel". Based on an embodiment, the ASR final hypothesis will be "Turn down the volume {silence}cancel" and NLU Slot Identification & Intent Resolution will be "Intent: No action". Based on the determination, the virtual assistant of the electronic device (100) responds with nothing (i.e. No Action Performed).

As shown in FIG. 15B, as shown in example illustration 1500b, the virtual assistant of the electronic device (100) receives the user utterance as "Call Naveen <silence 230 mSec> Don't". Based on the user input, the ASR final hypothesis will be "Call Naveen {silence 230 mSec}Don't". NLU Slot Identification & Intent Resolution will be "Intent: Cancel and Criteria {Name}: Naveen" As duration is small, probability of augmentation or cancelation can be more. Based on the determination, the virtual assistant of the electronic device (100) responds with "Call to Naveen cancelled"

Similarly, in another example, referring to FIG. 15C, as shown in example illustration 1500c, the virtual assistant of the electronic device (100) receives the user utterance as "Call Adam<silence> don't call". Based on an embodiment, the virtual assistant of the electronic device (100) responds with "nothing (i.e., No Action required)"

Similarly, in another example, referring to FIG. 15D, as shown in example illustration 1500d, the virtual assistant of the electronic device (100) receives the user utterance as "Convert Rs.7500 to US dollars <silence> Australian dollars". Based on an embodiment, the virtual assistant of the electronic device (100) responds with "It's 132.02 Australian dollars"

Similarly, in another example, referring to FIG. 15E, as shown in example illustration 1500e, the virtual assistant of the electronic device (100) receives the user utterance as "Search shoes on Amazon <silence> No Decathlon". Based on an embodiment, the virtual assistant of the electronic device (100) responds with "Searching shoes on Decathlon"

Similarly, in another example, referring to FIG. 15F, as shown in example illustration 1500f, the virtual assistant of the electronic device (100) receives the user utterance as "Bixby, change channel to 40.<silence> next". Based on an embodiment, the virtual assistant of the electronic device (100) responds with "Changed channel to next".

Figure 16:
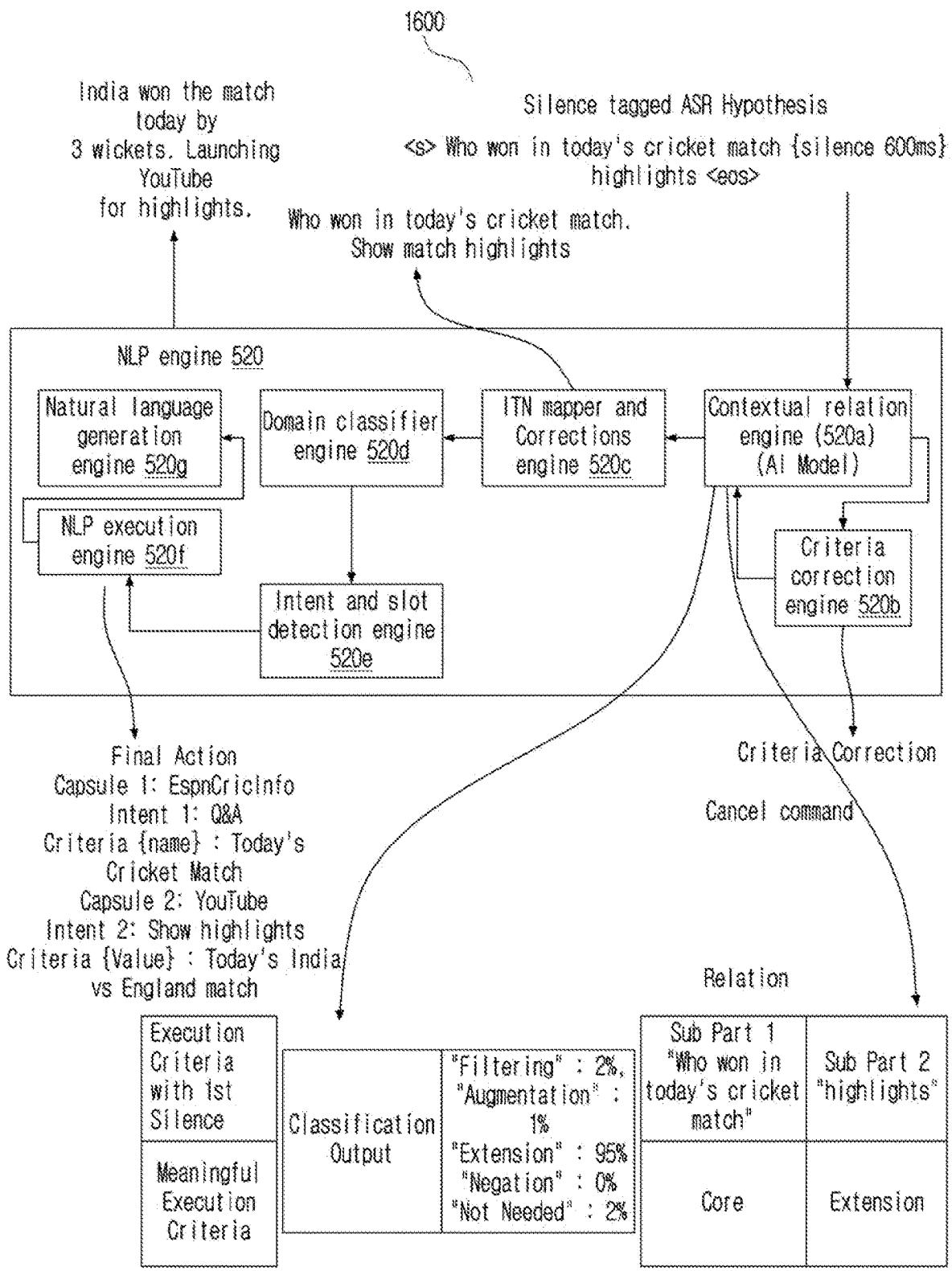
FIG. 16 and FIGS. 17A to 17D are example illustrations in which the electronic device performs the contextual analysis and intent/criteria correction dynamically in the complex voice command during an extension scenario, according to an embodiment.
Figure 17A:
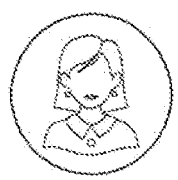
Figure 17B:
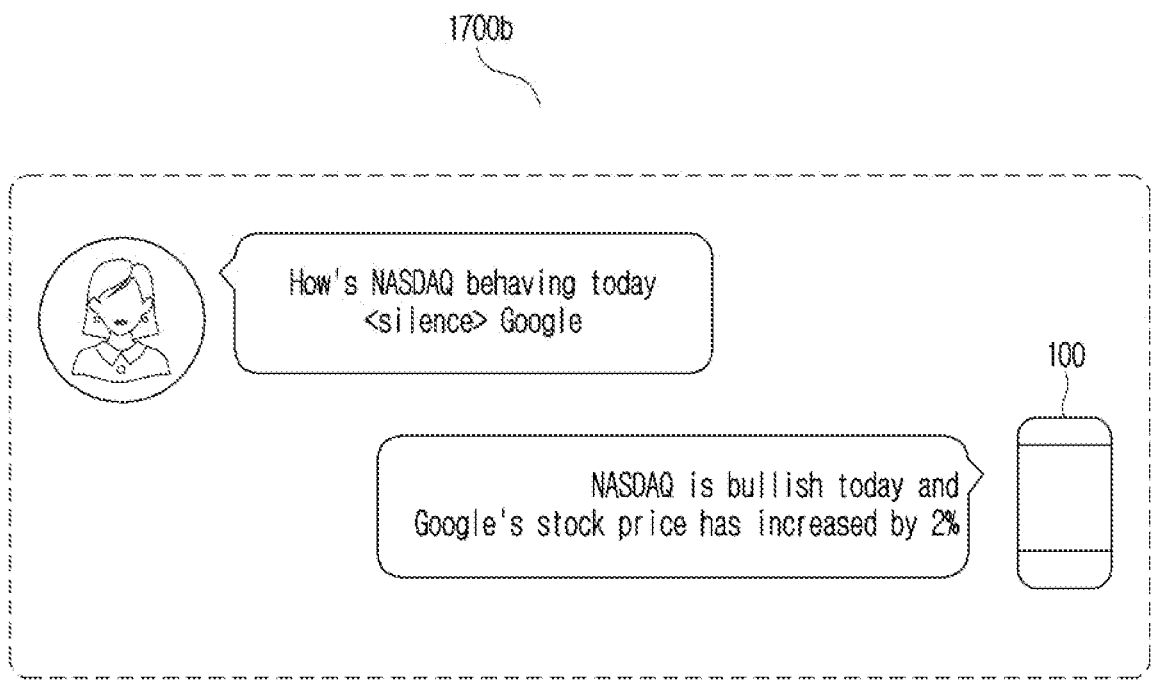
Figure 17C:
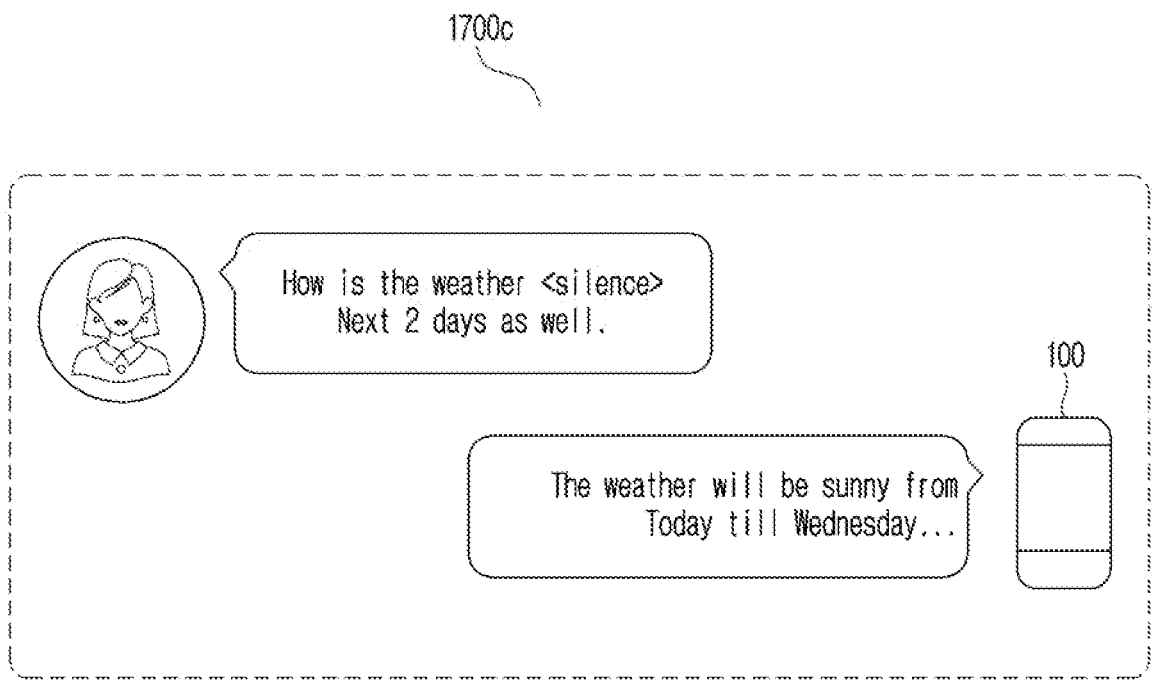
Figure 17D:
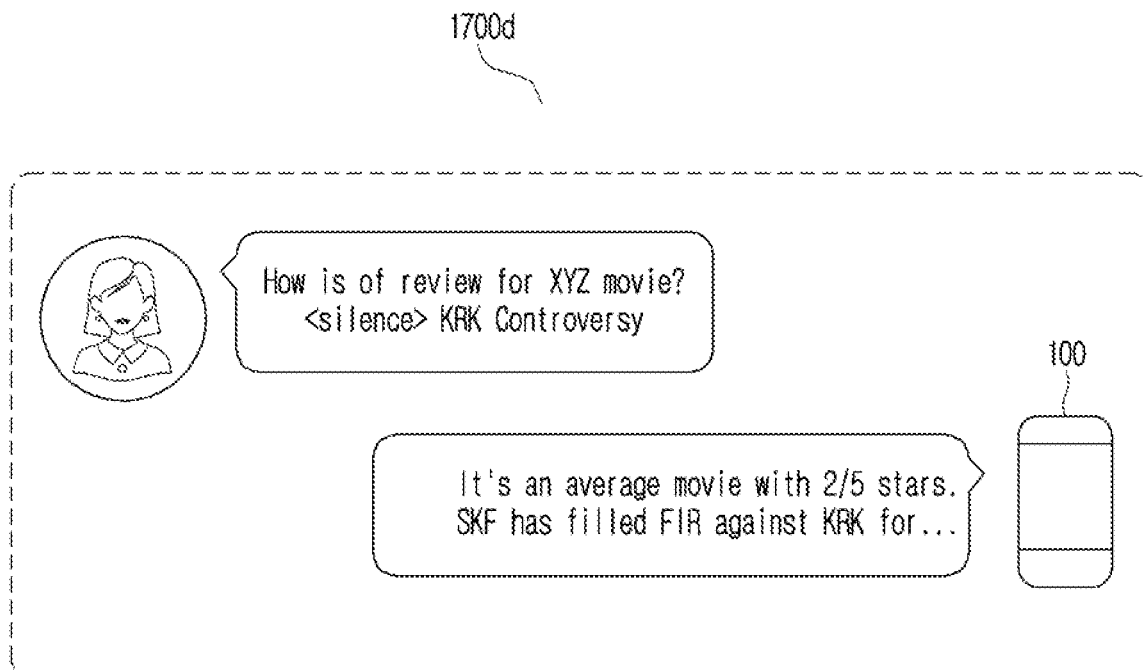

FIG. 16 through FIG. 17D are example illustrations 1600 1700d in which the electronic device (100) performs the contextual analysis and intent/criteria correction dynamically in the complex voice command during the extension scenario, according to an embodiment as disclosed herein.

In an example, the user of the electronic device (100) during the command, can realize that command can be updated to get extended results such as "Who won in today's cricket match <silence> highlights". Here the first part is base command, and second part is used to extend/additional results. The first part will help in determining the capsule, and show the result that India team has won the match. The second part highlight will trigger YouTube® or Hotstar® and the user will be shown highlight videos. In normal case of virtual assistant without silence and execution criteria detection, it would have tried to search "cricket match highlights" as slot value, and never would have gone to YouTube® or Hotstar®.

As shown in FIG. 16, the virtual assistant of the electronic device (100) receives the user utterance as "Who won in today's cricket match (silence) highlights". Based on an embodiment, the final ASR hypothesis will be "<s> Who won in today's cricket match {silence 600 ms}highlights <eos>. The contextual relation engine (520a) determines that the contextual correlation with the first silence is meaningful including the execution criteria in which the main execution criteria is Extension. The ITN mapper and corrections engine (520c) generates the utterance as "Who won in today's cricket match. Show match highlights" in which Intent is Capsule 1: EspnCricInfo®, Intent 1: Q&A, Criteria {name}: Today's Cricket Match and Capsule 2: YouTube, Intent 2: Show highlights, and Criteria {Value}: Today's India vs England match. Based on the determination, the virtual assistant of the electronic device (100) responds with "India won the match today by 3 wickets. Launching YouTube® for highlights".

As shown in FIG. 17A, as shown in example illustration 1700a, the virtual assistant of the electronic device (100) receives the user utterance as "What was today's IPL result?<silence> Man of the match". Based on the received user utterance, the ASR final hypothesis will be "What was today's IPL result {silence}Man of the match" and NLU Slot Identification & Intent Resolution will be "Intent: News, Criteria {search}: IPL result—Man of the Match and Criteria {time}: today" Based on an embodiment, the virtual assistant of the electronic device (100) responds with "ABC team won today, and "player A" was awarded man of the match. An embodiment may provide a response to user's enhanced query.

Similarly, in another example, referring to FIG. 17B, as shown in example illustration 1700b, the virtual assistant of the electronic device (100) receives the user utterance as "How's NASDAQ behaving today <silence> Google®". Based on an embodiment, the virtual assistant of the electronic device (100) responds with "NASDAQ is bullish today and Google's stock price has increased by 2%"

Similarly, in another example, referring to FIG. 17C, as shown in example illustration 1700c, the virtual assistant of the electronic device (100) receives the user utterance as "How is the weather <silence> Next 2 days as well". Based on an embodiment, the virtual assistant of the electronic device (100) responds with "The weather will be sunny from Today till Wednesday . . . "

Similarly, in another example, referring to FIG. 17D, as shown in example illustration 1700d, the virtual assistant of the electronic device (100) receives the user utterance as "How is of review for XYZ movie?<silence> KRK Controversy". Based on an embodiment, the virtual assistant of the electronic device (100) responds with "It's an average movie with 2/5 stars. SKF has filled FIR against KRK for . . . "

Figure 18:
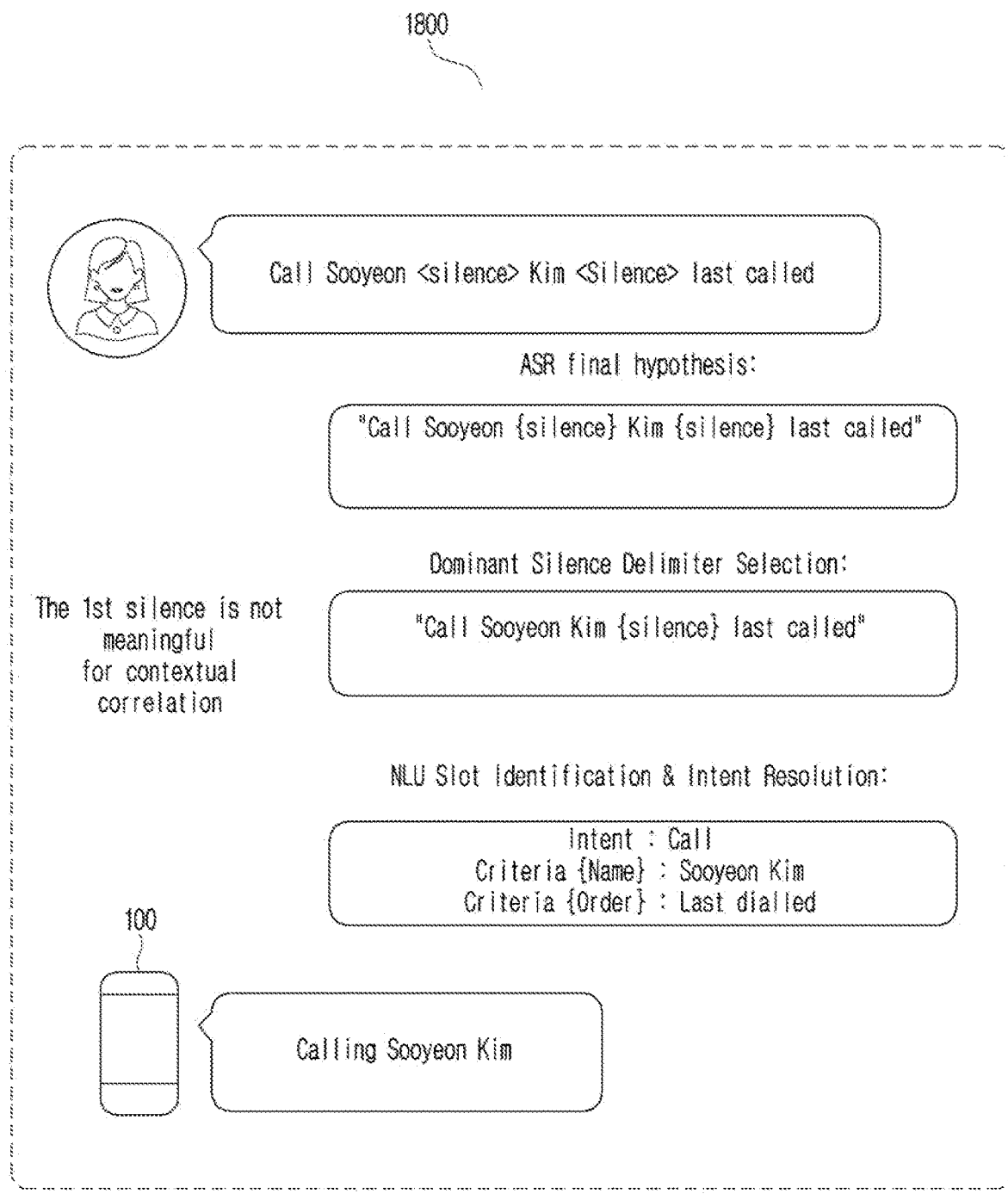
FIG. 18 and FIG. 19 are another example illustrations in which the electronic device performs the contextual analysis and intent/criteria correction dynamically in the complex voice command, according to an embodiment.
Figure 19:
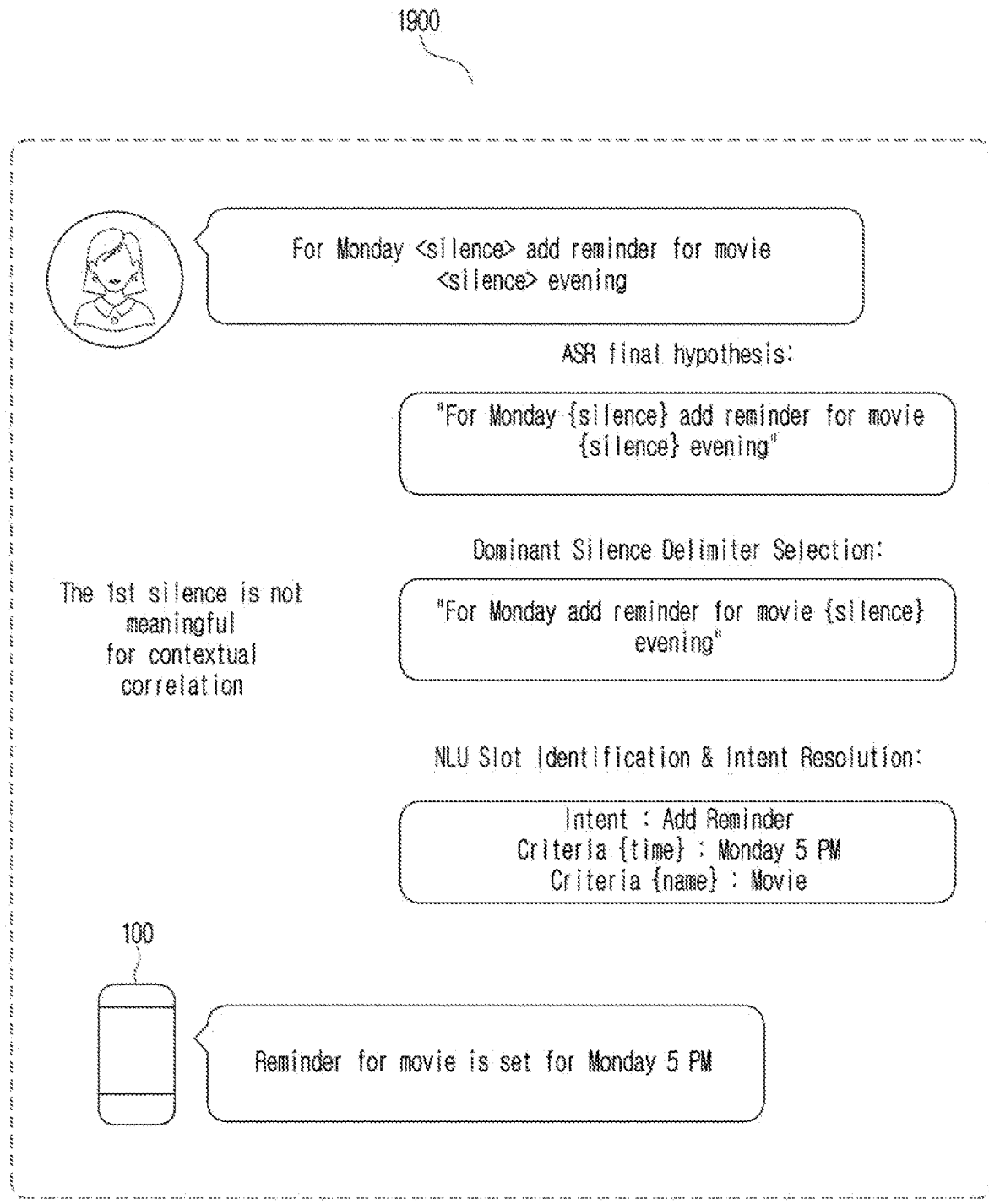

FIG. 18 and FIG. 19 are example illustrations (1800) and (1900) in which the electronic device (100) performs the contextual analysis and intent/criteria correction dynamically in the complex voice command, according to an embodiment as disclosed herein.

Referring to FIG. 18, as shown in example illustration 1800, the virtual assistant of the electronic device (100) receives the user utterance as "Call Sooyeon <silence> Kim <Silence> last called". Based on the input, the ASR final hypothesis will be "Call Sooyeon {silence}Kim {silence}last called". The first silence is not meaningful for contextual correlation, so that the dominant silence delimiter selection will be "Call Sooyeon Kim {silence}last called" and NLU slot identification and intent resolution will be Intent:Call, Criteria {Name}:Sooyeon Kim, Criteria {Order}:Last dialled. Based on the determination, the virtual assistant of the electronic device (100) responds with "calling Sooyeon Kim"

Referring to FIG. 19, as shown in example illustration 1900, the virtual assistant of the electronic device (100) receives the user utterance as "for Monday <silence> add reminder for movie <silence> evening". Based on an embodiment, the ASR final hypothesis will be "For Monday {silence}add reminder for movie {silence}evening". The first silence is not meaningful for contextual correlation, so that the dominant silence delimiter selection will be "For Monday add reminder for movie {silence}evening" and NLU Slot Identification and Intent Resolution will be "Intent:Add Reminder, Criteria {time}:Monday 5 PM and Criteria {name}: Movie". Based on the determination, the virtual assistant of the electronic device (100) responds with "Reminder for movie is set for Monday 5 PM".

FIG. 20A to FIG. 22 are example sequence diagram illustrations 2010, 2020, 2100, and 2200) in which the electronic device (100) performs the contextual analysis and intent/criteria correction dynamically in the complex voice command, according to an embodiment as disclosed herein.

Figure 20B:
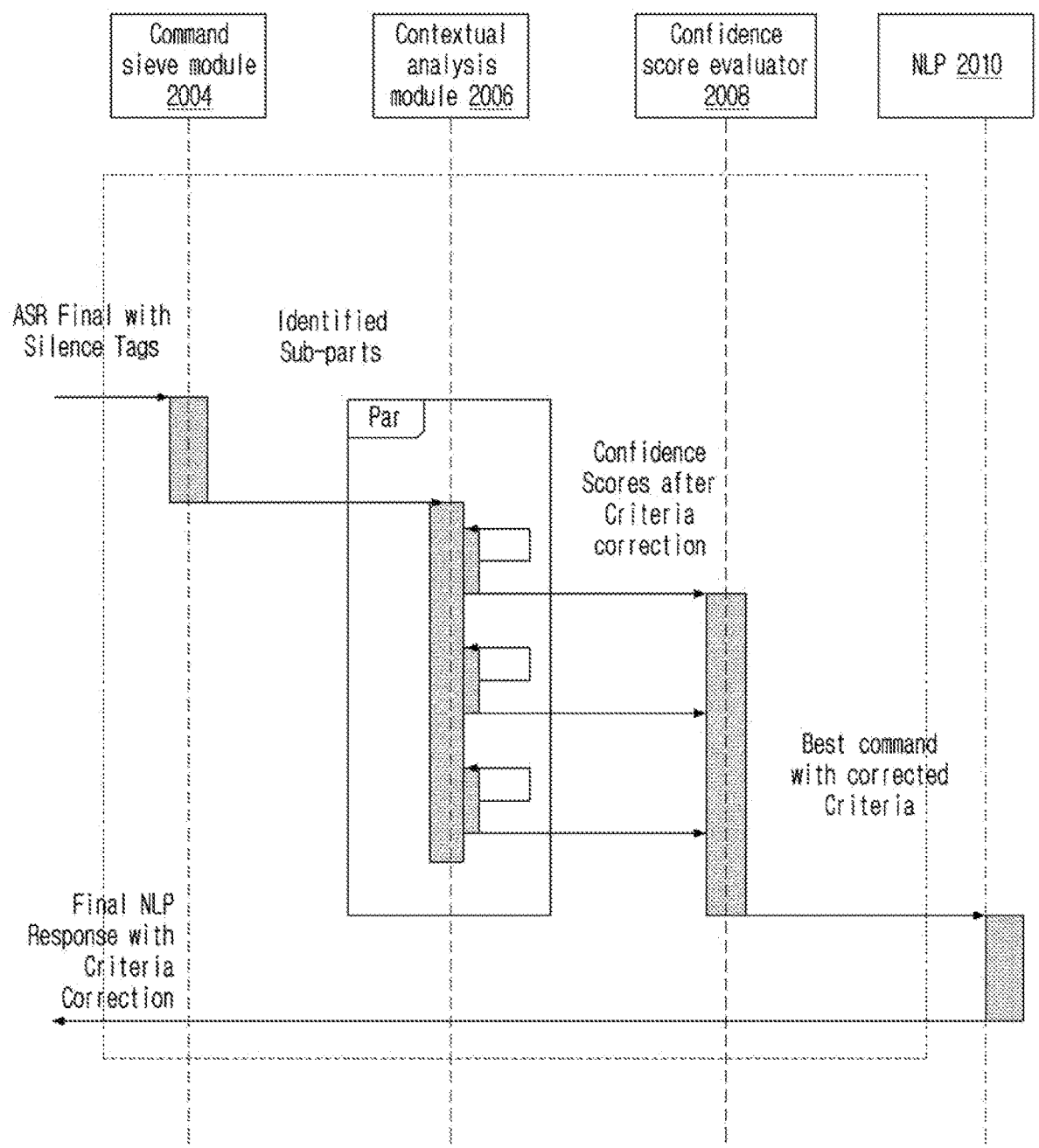

Referring to FIG. 20A and FIG. 20B, the virtual assistant (2002) receives the user utterance with the intermittent silence and sends to the received user utterance to the speech decoder (510b) and the speech/silence detection engine (510c). The speech decoder (510b) sends the recognized speech to the ASR engine (510) and the speech/silence detection engine (510c) sends the silence tags to the ASR engine (510). The ASR engine (510) provides the ASR final response with the silence tags to the command sieve module (2004). The command sieve module (2004) receives the ASR final response with the silence tags from the ASR engine (510) and identifies the sub-parts using a contextual analysis module (2006). The contextual analysis module (2006) sends the identified sub-parts to a confidence score evaluator (2008). The confidence score evaluator (2008) determines the confidence scores after the execution criteria correction. The confidence score evaluator (2008) shares the best command with corrected criteria to the NLP.

Figure 21:
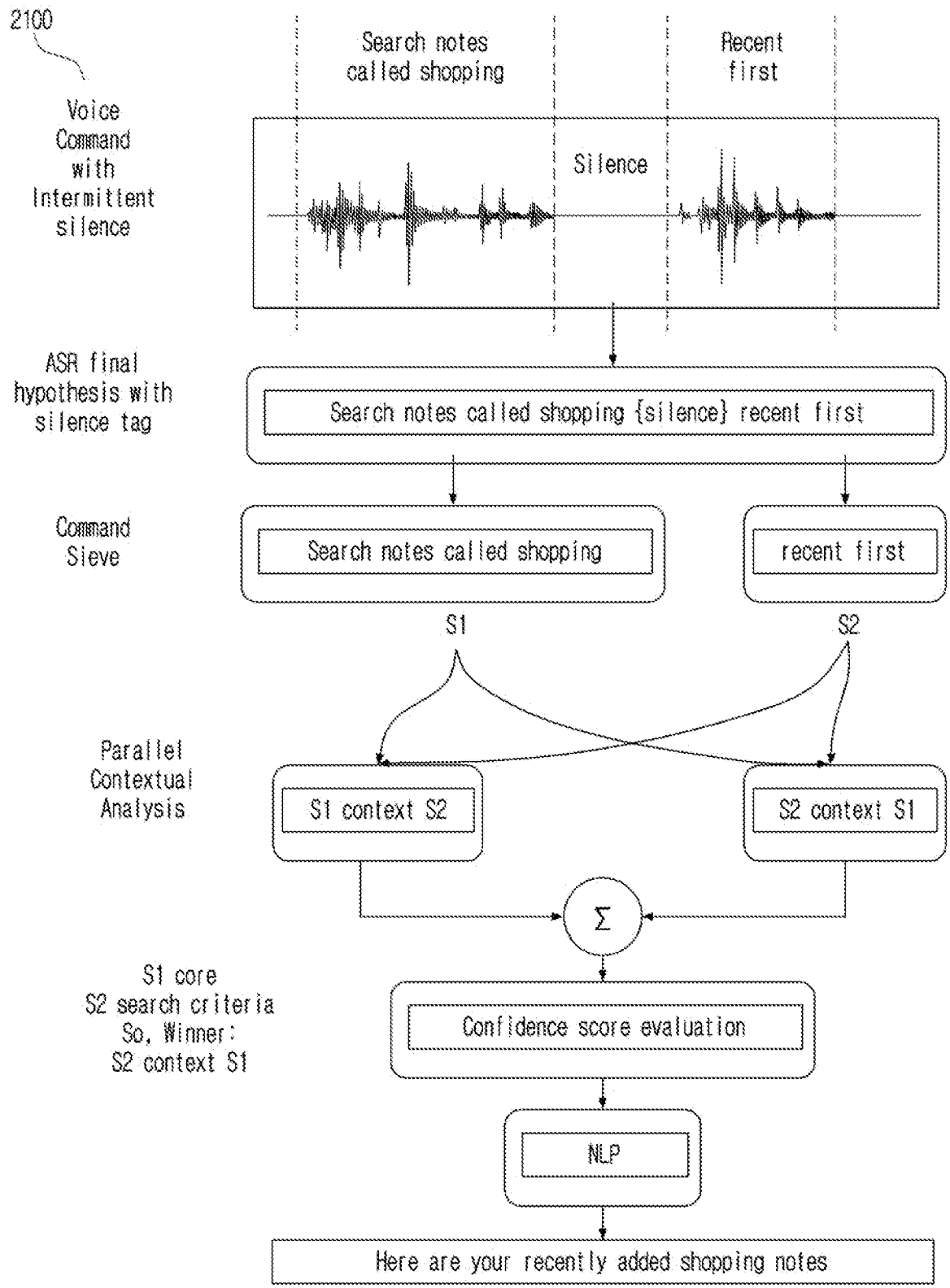
Figure 22:
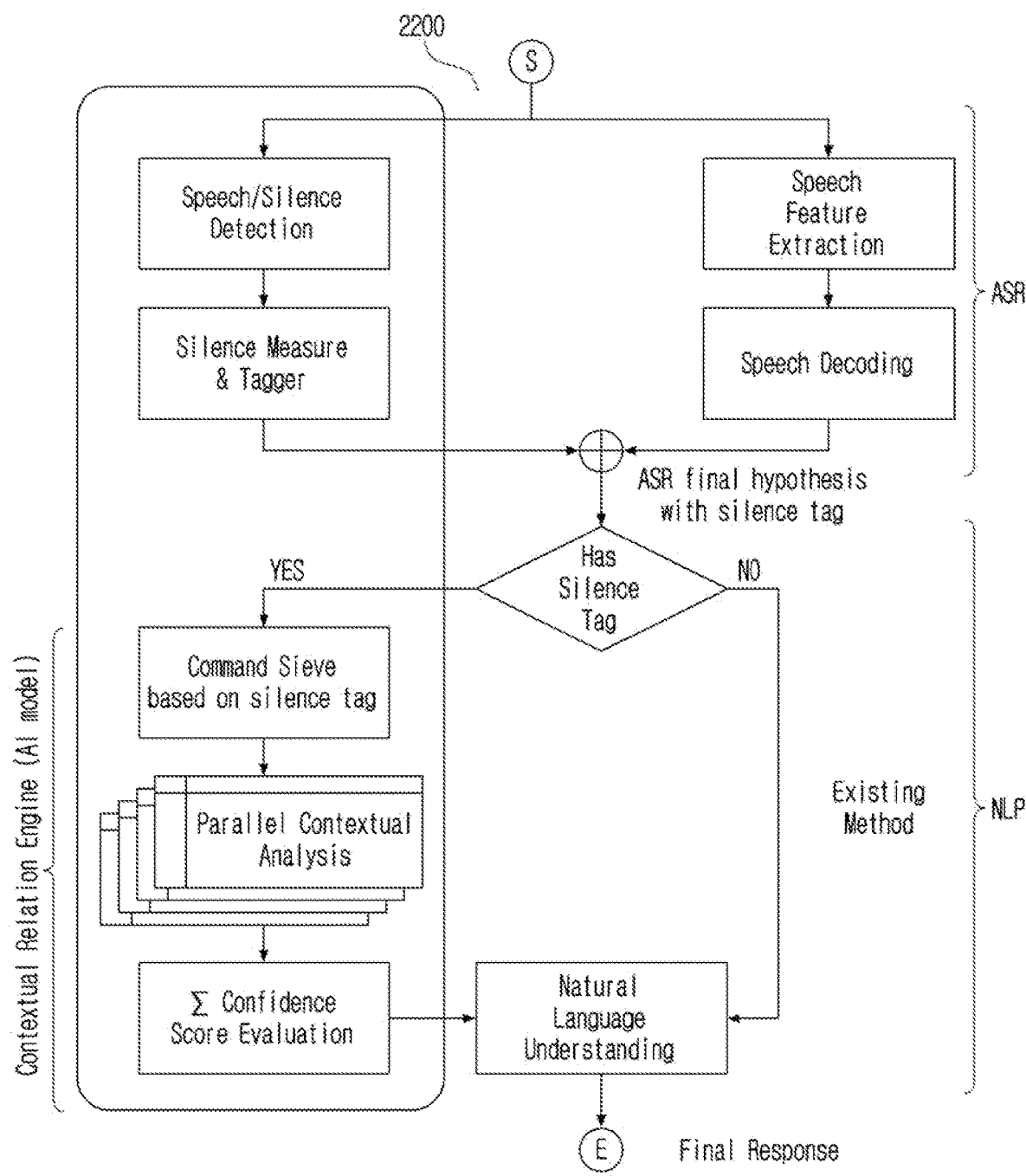

The operations of contextual analysis and intent/criteria correction in FIG. 21 and FIG. 22 are explained in conjunction with FIG. 23 to FIG. 26. For example, an example of aa silence measure and tagger operation is explained with respect to FIGS. 23 and 24, an example of a contextual analysis operation explained with respect to FIG. 25, and examples of parallel contextual analysis, confidence score evaluation, criteria correction and ITN mapper and corrections engine operation are explained with respect to FIG. 26.

Figure 23:
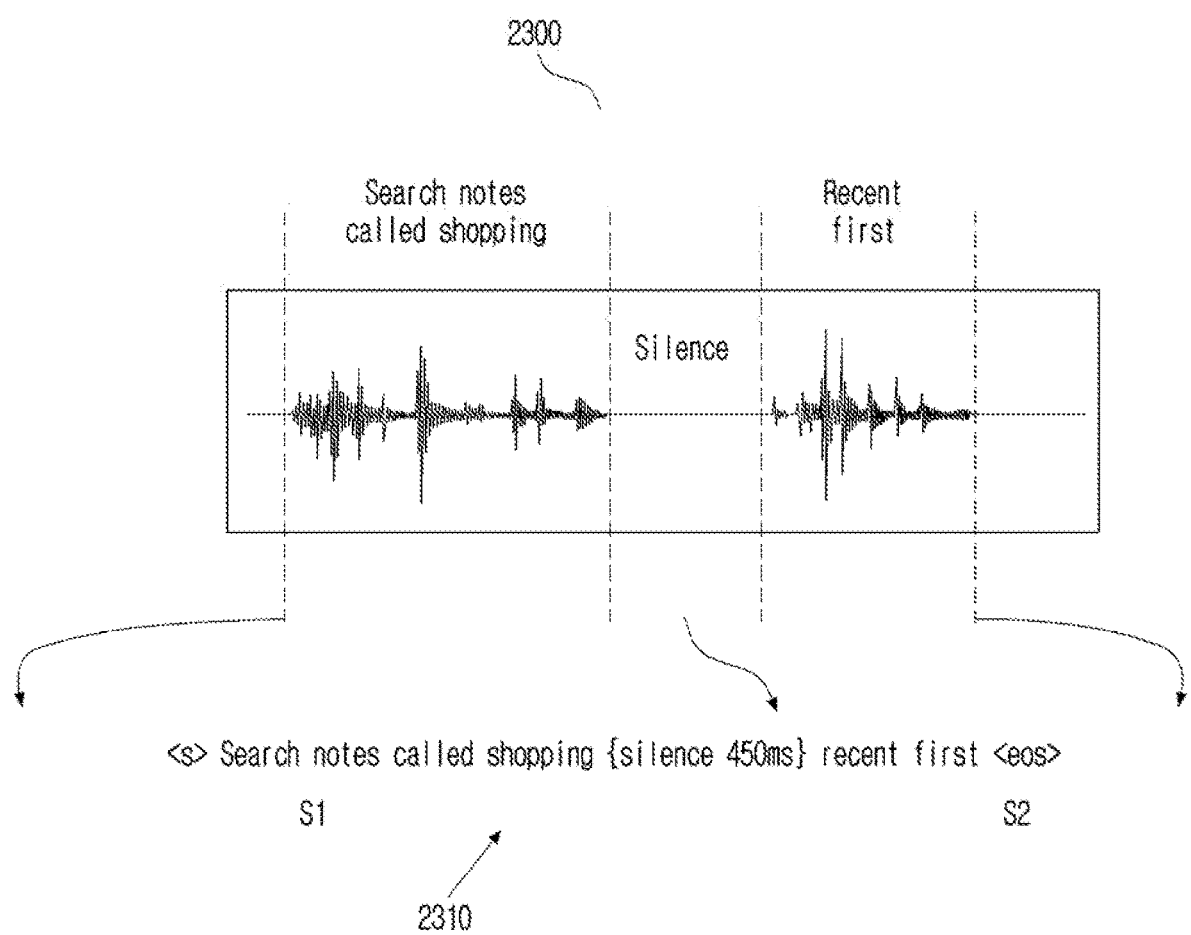
FIG. 23 is an example illustration in which silence measure and tagger operation is depicted, according to an embodiment.
Figure 24:
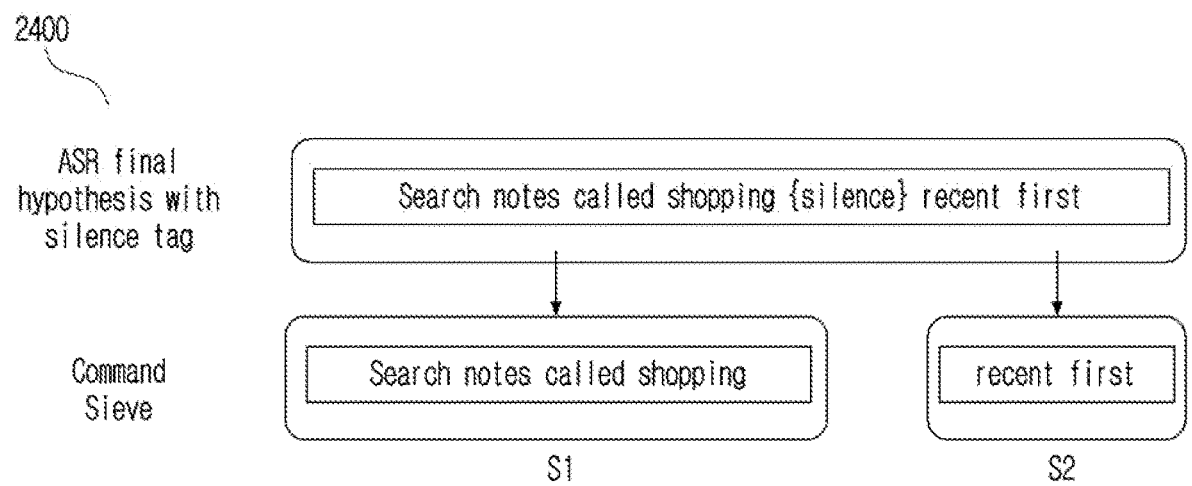
FIG. 24 is an example illustration in which contextual analysis operation is depicted, according to an embodiment.

FIG. 23 and FIG. 24 are example illustration 2300 and 2400 in which speech/silence detection engine operation is depicted, according to an embodiment as disclosed herein. The speech/silence detection engine (510c) is part of the VAD unit. The speech/silence detection engine (510c) identifies consecutive audio buffers marked as silence (or not speech). When the length of such consecutive audio buffers exceeds a predefined threshold value, the speech/silence detection engine (510c) will diligently mark the part of transcribed text with silence information. Marked silence information, an example of which is shown as information 2310 will include the position of the silence in user voice command and duration of silence detected between two speech parts.

Figure 25:
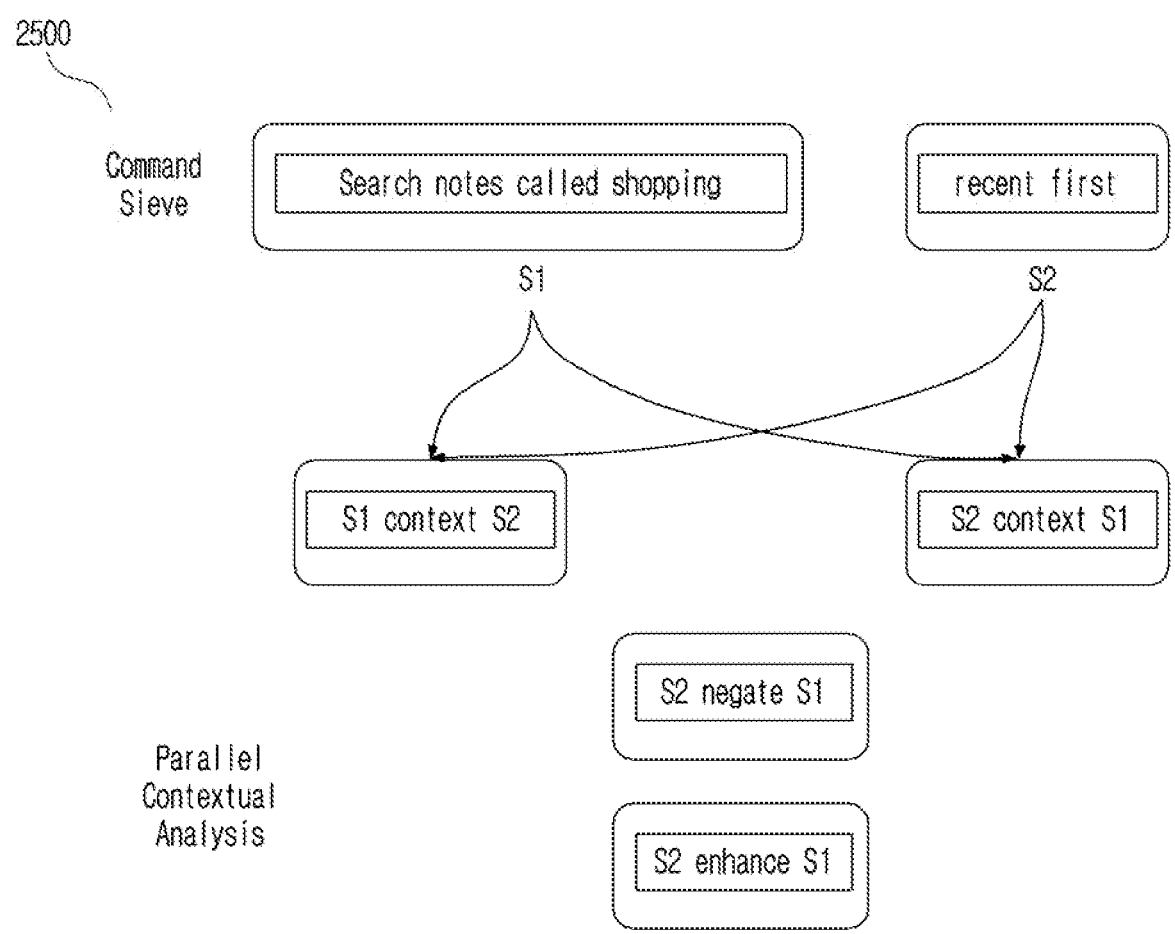
FIG. 25 is an example illustration in which parallel contextual analysis is depicted, according to an embodiment.

FIG. 25 is an example illustration (2400) in which contextual analysis operation is depicted, according to an embodiment as disclosed herein. The AI based engine/model (e.g., contextual analysis module (2006)), contextually evaluates multiple sub-parts of the user voice command to produce a single executable sentence for execution by the NLP engine (520). In an embodiment, the contextual analysis module (2006) includes the command sieve module (2004). The command sieve module (2004) will segregate the parts of the user command based on silence tag (e.g. S1 and S2 as shown in FIG. 21 to FIG. 26). Further, the command sieve module (2004) will generate multiple parallel instances of contextual analysis blocks to understand the relationship between sub-parts of user command.

Figure 26:
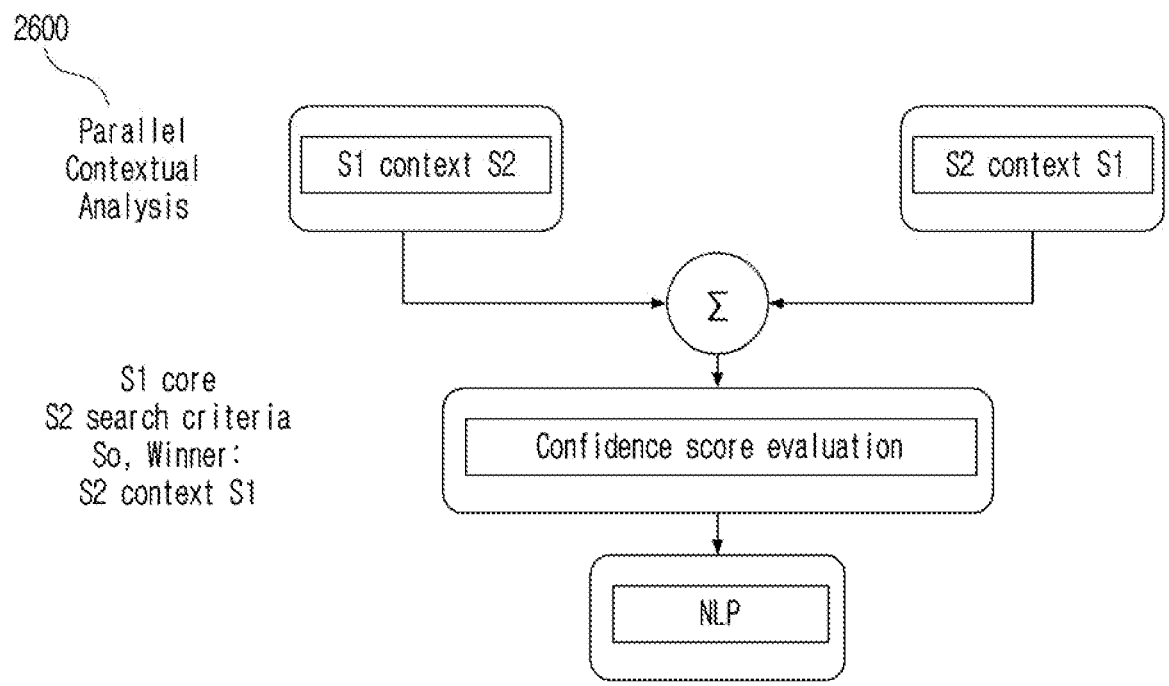
FIG. 26 is an example illustration in which confidence score evaluation operation, criteria correction operation, and Inverse Text Normalization (ITN) mapper and corrections engine operation are depicted, according to an embodiment.

FIG. 26 is an example illustration (2500) in which parallel contextual analysis is depicted, according to an embodiment as disclosed herein. It consists of contextual analysis blocks executing in parallel for each of the combination of sub-parts generated by the command sieve module (2004). Each of the contextual analysis blocks can be implemented by using attention based RNN module having learnt the weights of contextual correlation between multiple sub-parts of the sentence. This will transform multiple sub-part based voice command into the single executable sentence for the NLP. Each of the transformed sentences is marked with confidence score for its accuracy of transformation.

The confidence score evaluator (2008) evaluates confidence score of each of contextual analysis models executing in parallel, which can be implemented using deep learning based classification models involving evaluation criteria. Based on evaluation criteria, the confidence score evaluator (2008) will decide the winning single executable sentence.

Further, if the contextual analysis subpart is S1 context S2 or S2 context S1, the follow-up action generation engine generates consecutive parts of voice command in the executable format. The ML based engine aware of domain classifier failures in cases where single commands can fail and trigger different domain. In these cases the first generated sub-part is sent to the domain classifier engine (520d), and most suitable capsule is selected, and the follow-up action subpart is sent to the selected input for enhanced execution. The RNN based sequence generation for follow-up intent and slots is trained and used.

If the contextual analysis sub parts are S1 context S2 or S2 context S1, then the ITN mapper and corrections engine (520c) transforms multiple sub-part based voice command into a single executable sentence for NLP. Further, the neural network (e.g., attention based sequence to sequence RNN engine) is used to convert multiple sub-part voice command text into a final single text.

The various actions, acts, blocks, steps, or the like in the flow charts 600 and 700 may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for providing an interaction with a virtual assistant, the method comprising:
   identifying, by an electronic device, at least one of a duration of a silence between a first portion of an utterance received from a user and a second portion of the utterance, and a position of the silence in the utterance;

determining, by the electronic device, a contextual relationship between the first portion of the utterance and the second portion of the utterance based on the duration of the silence and the position of the silence;

determining, by the electronic device, at least one execution criteria corresponding to the first portion of the utterance and the second portion of the utterance based on the determined contextual relationship; and generating, by the electronic device, a response corresponding to the utterance by executing the first portion of the received utterance and the second portion of the received utterance using different execution criteria based on the duration of the silence and the position of the silence, wherein the at least one execution criteria comprises at least one of a filtering criteria, an augmentation criteria, a negation criteria and an extension criteria, wherein the at least one execution criteria is determined based on the duration of the silence and the position of the silence, wherein the generating of the response corresponding to the utterance comprises:

based on the silence being shorter than a first threshold time, identifying the silence as a meaningful gap between words or as an insertion of supplementary information;

based on the silence being equal to or longer than the first threshold time and shorter than a second threshold time, identifying the silence as at least one of a new condition, command correction, or intent modification; and based on the silence being equal to or longer than the second threshold time, identifying the silence as at least one of command cancellation, filtering, or information replacement.

2. The method as claimed in claim 1, wherein the at least one execution criteria is determined using a reinforcement learning model which learns a pattern corresponding to the user, and wherein the user of the electronic device selects preferred execution criteria based on multiple execution criteria being determined based on the pattern corresponding to the user.

3. The method as claimed in claim 1, wherein the at least one execution criteria is determined based on a correlation such that the second portion of the utterance is at least one of a filter to the first portion, an augmentation to a criterion of the first portion, a negation of intent to the first portion, and an extension of the criterion of the first portion.

4. The method as claimed in claim 1, wherein the determining of the contextual relationship comprises:

segregating at least one part of the utterance based on the at least one of the duration of the silence and the position of the silence;

generating multiple parallel instances of contextual analysis blocks to understand a relationship between the at least one part of the utterance;

transforming multiple sub-part based utterances into a single executable sentence for natural language processing (NLP), wherein each of the transformed multiple sub-part based utterances are marked with a corresponding confidence score; and determining the contextual relationship based on the generated multiple parallel instances of the contextual analysis blocks.

5. The method as claimed in claim 4, wherein the contextual analysis blocks are executed in parallel for each combination of sub-parts generated by a command sieve module, and wherein each of the contextual analysis blocks is implemented using a data driven model having learned weights of contextual correlation between the sub-parts.

6. The method as claimed in claim 1, wherein the determining of the contextual relationship comprises:

identifying a relationship in the first portion of the utterance based on a context of the second portion of the utterance; and determining the contextual relationship between the first portion of the utterance and the second portion of the utterance by using at least one of an intent, a slot update, a negation and an enhancement between the identified relationship, wherein the contextual relationship of sub-parts in the utterance is used to update the intent to optimize a natural language processing (NLP) response based on the duration of the silence and the position of the silence.

7. The method as claimed in claim 1, wherein the position of the silence corresponds to a time period of silence within an utterance time frame.

8. The method as claimed in claim 1, wherein the generating of the response corresponding to the utterance comprises:

based on the silence being identified in a middle position of the utterance and information following the silence being supplementary, generating the response using an augmentation criterion;

based on the silence being identified in an end position of the utterance and the information following the silence being a filtering request if the information functions as a filter, generating the response using a filtering criterion;

based on the silence being identified in the end position of the utterance and the information following the silence being a negation if the information functions as the filter, generating the response using a negation criterion; and based on the silence being identified in the end position of the utterance and the information following the silence being an additional request if the information functions as the filter, generating the response using an extension criterion.

9. An electronic device for providing an interaction with a virtual assistant, the electronic device comprising:

a memory, a processor, and a silence based virtual assistant controller, coupled with the memory and the processor, configured to:

identify at least one of a duration of a silence between a first portion of an utterance received from a user and a second portion of the utterance, and a position of the silence in the utterance;

determine a contextual relationship between the first portion of the utterance and the second portion of the utterance according to the duration of the silence and the position of the silence;

determine at least one execution criteria corresponding to the first portion of the utterance and the second portion of the utterance based on the determined contextual relationship; and generate a response corresponding to the utterance by executing the first portion of the received utterance and the second portion of the received utterance using different execution criteria based on the duration of the silence and the position of the silence, wherein the at least one execution criteria comprises at least one of a filtering criteria, an augmentation criteria, a negation criteria and an extension criteria, wherein the processor is further configured to:
    based on the silence being shorter than a first threshold time, identify the silence as a meaningful gap between words or as an insertion of supplementary information;
    based on the silence being equal to or longer than the first threshold time and shorter than a second threshold time, identify the silence as at least one of a new condition, command correction, or intent modification; and
    based on the silence being equal to or longer than the second threshold time, identify the silence as at least one of command cancellation, filtering, or information replacement.

10. The electronic device as claimed in claim 9, wherein the at least one execution criteria is determined using a reinforcement learning model which learns a pattern corresponding to the user, and
    wherein the user of the electronic device selects preferred execution criteria based on multiple execution criteria being determined based on the pattern corresponding to the user.

11. The electronic device as claimed in claim 9, wherein the at least one execution criteria is determined based on a correlation such that the second portion of the utterance is at least one of a filter to the first portion, an augmentation to a criteria of the first portion, a negation of intent to the first portion, and tan extension of criteria.

12. The electronic device as claimed in claim 9, wherein the contextual relationship is determined by:
    segregating at least one part of the utterance based on the at least one of the duration of the silence and the position of the silence;
    generating multiple parallel instances of contextual analysis blocks to understand a relationship between the at least one part of the utterance;
    transforming multiple sub-part based utterance into a single executable sentence for natural language processing (NLP), wherein each of the transformed multiple sub-part based utterances are marked with a corresponding confidence score; and
    determining the contextual relationship based on the generated multiple parallel instances of the contextual analysis blocks.

13. The electronic device as claimed in claim 9, wherein the processor further configured to:
    based on the silence being identified in a middle position of the utterance and information following the silence being supplementary, generating the response using an augmentation criterion;
    based on the silence being identified in an end position of the utterance and the information following the silence being a filtering request if the information functions as a filter, generating the response using a filtering criterion;
    based on the silence being identified in the end position of the utterance and the information following the silence being a negation if the information functions as the filter, generating the response using a negation criterion; and
    based on the silence being identified in the end position of the utterance and the information following the silence being an additional request if the information functions as the filter, generating the response using an extension criterion.

* * * * *